(12) United States Patent
Karamanos

(10) Patent No.: US 8,146,377 B2
(45) Date of Patent: Apr. 3, 2012

(54) SHIPPING AND INSTALLATION FOR HEATING, VENTILATION, AND AIR CONDITIONING (HVAC)

(76) Inventor: John C. Karamanos, San Jose, CA (US)

(*) Notice: Subject to any disclaimer, the term of this patent is extended or adjusted under 35 U.S.C. 154(b) by 326 days.

(21) Appl. No.: 12/573,737

(22) Filed: Oct. 5, 2009

(65) Prior Publication Data
US 2010/0252641 A1 Oct. 7, 2010

Related U.S. Application Data

(63) Continuation of application No. 11/429,418, filed on May 5, 2006, now Pat. No. 7,596,962.

(60) Provisional application No. 60/755,976, filed on Jan. 3, 2006, provisional application No. 60/678,695, filed on May 6, 2005.

(51) Int. Cl.
*F25D 19/00* (2006.01)
*F25D 23/12* (2006.01)

(52) U.S. Cl. .......................................... 62/259.1; 62/298

(58) Field of Classification Search .............. 62/259.1, 62/298; 165/61, 256; 236/49.3; 454/229, 454/236; 248/68.1, 49, 65, 300; 294/142
See application file for complete search history.

(56) References Cited

U.S. PATENT DOCUMENTS

| | | | |
|---|---|---|---|
| 1,429,776 A | 9/1922 | Robinson |
| 1,793,059 A | 2/1931 | Chambers |
| 2,233,273 A | 2/1941 | Di Vincenzo |
| 2,534,690 A | 12/1950 | Young, Jr. et al. |
| 2,999,605 A | 9/1961 | De Jarnett |
| 3,216,025 A | 11/1965 | Roll |
| 3,706,125 A | 12/1972 | Hopkins |
| 3,778,537 A | 12/1973 | Miller |
| 4,099,630 A | 7/1978 | Beck |
| 4,123,012 A | 10/1978 | Hough |
| 4,140,227 A | 2/1979 | Beck |
| 4,163,372 A | 8/1979 | Frye et al. |
| 4,193,563 A | 3/1980 | Vitale |

(Continued)

FOREIGN PATENT DOCUMENTS

JP 62-008033 1/1987

(Continued)

OTHER PUBLICATIONS

Author Unknown, Ashrae Fundamentals Handbook, 1997, p. 37.6, 1 page.

(Continued)

*Primary Examiner* — Chen Wen Jiang
(74) *Attorney, Agent, or Firm* — Kilpatrick Townsend & Stockton LLP

(57) ABSTRACT

A zone-control unit adapted for facile inclusion in a building's ductwork includes a mechanical terminal unit, inlet and outlet piping assemblies that are mechanically coupled together. The structure also includes at least one handle so the zone-control unit may be conveniently and safely handled both during shipping, and during installation into a HVAC system. Prior to installation into a HVAC system the fully-functional zone-control unit also includes a pair of caps respectively sealing the ends of the piping assemblies, and a pressure gauge for sensing pressurization of the piping assemblies and coil which the caps seal. Sealed in this way a pressure gauge permits testing to assure that the piping assemblies and coil are leak free, and readily assessing that zone-control units remain leak free until they are about to be installed into a building's HVAC system.

16 Claims, 27 Drawing Sheets

U.S. PATENT DOCUMENTS

| | | | |
|---|---|---|---|
| 4,244,542 A | 1/1981 | Matthews | |
| 4,261,529 A | 4/1981 | Sandberg et al. | |
| 4,328,926 A | 5/1982 | Hall, Jr. | |
| 4,541,602 A | 9/1985 | Potzas | |
| 4,550,891 A | 11/1985 | Schaty | |
| 4,779,815 A | 10/1988 | Moore et al. | |
| 4,842,227 A | 6/1989 | Harrington et al. | |
| 4,928,856 A | 5/1990 | White | |
| 4,971,139 A | 11/1990 | Khattar | |
| 5,016,843 A | 5/1991 | Ward | |
| 5,050,824 A | 9/1991 | Hubbard | |
| 5,278,740 A | 1/1994 | Agnelli | |
| 5,417,243 A | 5/1995 | Ragona | |
| 5,458,241 A | 10/1995 | Brown | |
| 5,526,931 A | 6/1996 | White | |
| 5,551,630 A | 9/1996 | Enoki et al. | |
| 5,597,354 A | 1/1997 | Janu et al. | |
| 5,771,954 A | 6/1998 | Benner et al. | |
| 5,850,037 A | 12/1998 | Mullins | |
| 5,860,627 A | 1/1999 | Edwards | |
| 5,986,562 A | 11/1999 | Nikolich | |
| 6,135,381 A | 10/2000 | Teson | |
| 6,142,405 A | 11/2000 | Black | |
| 6,170,784 B1 | 1/2001 | MacDonald et al. | |
| 6,409,223 B1 | 6/2002 | Bartholoma | |
| 6,536,516 B2 | 3/2003 | Davies et al. | |
| 6,557,574 B2 | 5/2003 | Federspiel | |
| 6,564,819 B2 | 5/2003 | Zelczer | |
| 6,578,319 B1 | 6/2003 | Cole et al. | |
| D490,690 S | 6/2004 | Brass et al. | |
| 6,951,324 B2 | 10/2005 | Karamanos | |
| 7,140,236 B2 | 11/2006 | Karamanos | |
| 7,165,797 B2 | 1/2007 | Karamanos | |
| 7,387,013 B2 | 6/2008 | Karamanos | |
| 7,444,731 B2 | 11/2008 | Karamanos | |
| 7,537,183 B2 | 5/2009 | Karamanos | |
| 7,596,962 B2 | 10/2009 | Karamanos | |
| 7,856,865 B2 | 12/2010 | Karamanos | |
| 2002/0080032 A1 | 6/2002 | Smith et al. | |
| 2002/0088273 A1 | 7/2002 | Harness et al. | |
| 2003/0050871 A1 | 3/2003 | Broughton | |
| 2003/0085022 A1 | 5/2003 | Viso | |
| 2003/0085023 A1 | 5/2003 | Viso | |
| 2003/0171092 A1 | 9/2003 | Karamanos | |
| 2003/0222185 A1 | 12/2003 | Rubenstein et al. | |
| 2004/0159110 A1 | 8/2004 | Janssen | |
| 2004/0253918 A1 | 12/2004 | Ezell et al. | |
| 2005/0039470 A1 | 2/2005 | Laing et al. | |
| 2006/0249589 A1 | 11/2006 | Karamanos | |
| 2007/0262162 A1 | 11/2007 | Karamanos | |
| 2008/0164006 A1 | 7/2008 | Karamanos | |
| 2009/0057499 A1 | 3/2009 | Karamanos | |
| 2010/0307733 A1 | 12/2010 | Karamanos et al. | |

FOREIGN PATENT DOCUMENTS

| | | |
|---|---|---|
| JP | 02-035326 | 2/1990 |
| JP | 07055195 A * | 3/1995 |
| JP | 08189717 A * | 7/1996 |
| JP | 2000046375 A | 2/2000 |
| JP | 2001004199 A * | 1/2001 |

OTHER PUBLICATIONS

Model SDR Catalog, "Standard Construction Features", Environmental Technologies, Inc., Oct. 2001, pp. 6-9 and 12-13.

* cited by examiner

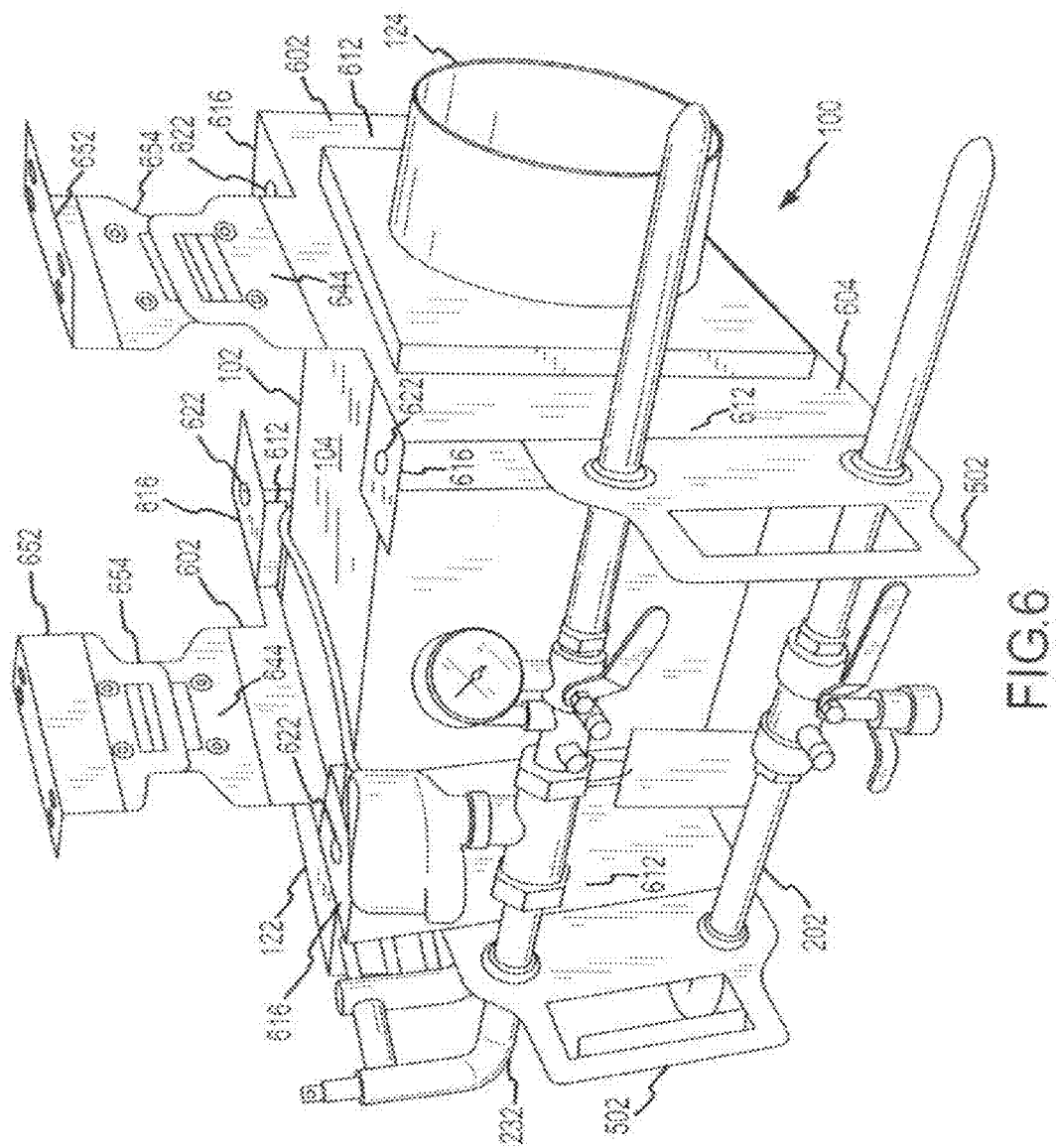

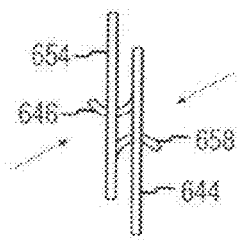
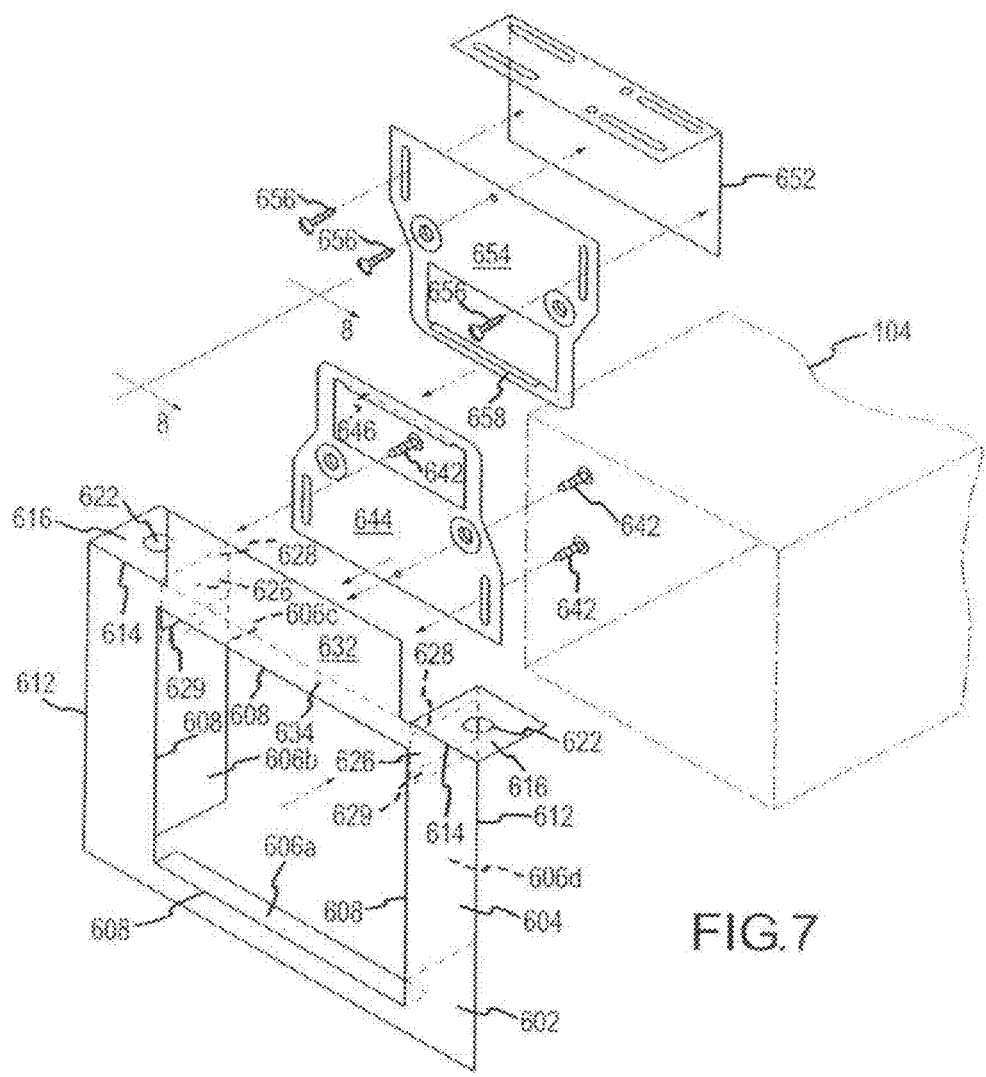

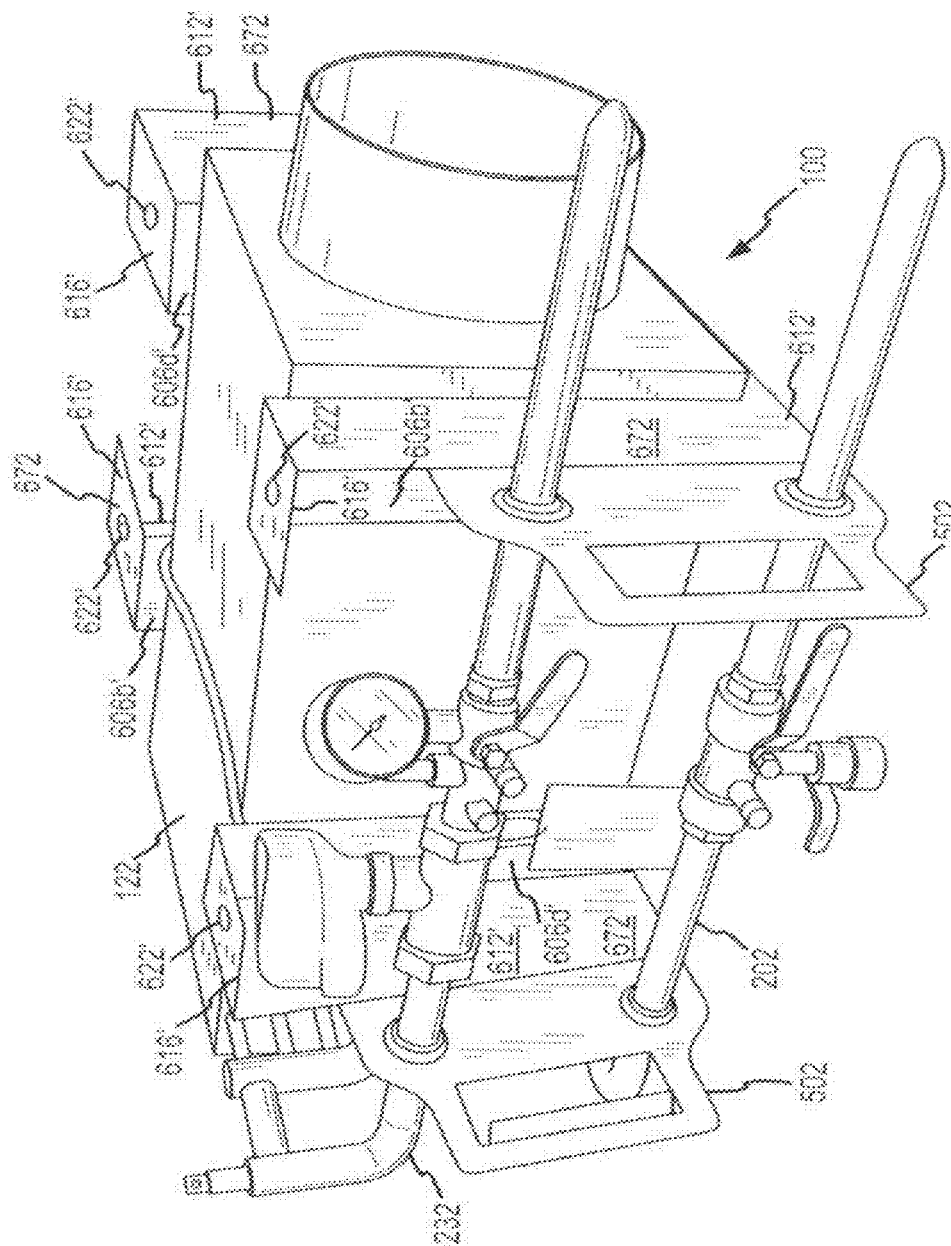

SHIPPING AND INSTALLATION FOR HEATING, VENTILATION, AND AIR CONDITIONING (HVAC)

CROSS-REFERENCES TO RELATED APPLICATIONS

This application is a continuation of U.S. patent application Ser. No. 11/429,418, entitled SHIPPING AND INSTALLATION FOR HEATING, VENTILATION, AND AIR CONDITIONING (HVAC), filed May 5, 2006. This application claims priority to U.S. Patent Application Nos. 60/678,695 filed May 6, 2005 and 60/755,976 filed Jan. 3, 2006. This application is also related to U.S. patent application Ser. No. 11/180,310 filed Jul. 12, 2005, which is a continuation of U.S. Pat. No. 6,951,324; and to U.S. patent application Ser. No. 10/857,211 filed May 24, 2004; and to U.S. patent application Ser. No. 10/860,573 filed Jun. 2, 2004. This application is also related to U.S. patent application Ser. No. 10/092,933 filed Sep. 11, 2003. The entire contents of each of these applications and their priority filings are incorporated herein by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present disclosure relates to methods, systems and apparatuses for building heating, ventilation, and air conditioning ("HVAC") systems and, more particularly to assembly, verification, and maintenance of a fully functional terminal unit, or a functionally equivalent device called a lab valve damper when installed in certain environments.

In general, HVAC systems control the temperature and humidity of indoor air. In most HVAC systems, air is drawn in, filtered, cooled and dehumidified or heated and humidified, and then delivered to an air conditioned space. The greatest portion of incoming air is drawn from the air conditioned space for recirculation through the HVAC system. HVAC system includes fans and ductwork for moving conditioned air to where it is needed while passing it through cooling and/or a heating sections of the ductwork.

One risk which should be addressed in designing and operating HVAC systems is that of biological contamination by bacteria, molds, and viruses. In recent years, biological problems in indoor environments have received considerable attention. Most frequently, molds, bacteria and/or virus grow wherever water collects in a HVAC systems ductwork, such as at its cooling sections.

Poor indoor air quality ("IAQ") and the spread of infectious disease through a HVAC system, at a minimum, can reduce worker productivity and increase absenteeism. Even more alarming is the potential liability for illnesses suffered by workers due to poor IAQ. The Legionnaires' disease outbreak in Philadelphia in 1976, is probably the most publicized instance of illness caused by poor IAQ. Even if contamination by molds and bacteria doesn't affect workers, their growth within HVAC system equipment creates maintenance problems which are very costly to correct. Left uncorrected, these problems exacerbate and, at a minimum, eventually reduce system's heat transfer efficiency.

HVAC systems in residential, commercial, education and research buildings usually include metallic pipes, hollow composite materials such as tubes, and the like. The systems are typically supported from and between floor or ceiling joists. The HVAC system typically includes a primary or main duct. A series of smaller branch ducts which extend from the main duct are mounted between adjacent floor or ceiling joists. Such main and branch ducts are normally supported by metal hangers located between the joists. Often the branch ducts include pipes and conduit lines for transporting liquid or gas which are suspended from ceiling joists or an adjacent wall typically with Unistrut®, threaded rod, couplings, and various hanger brackets.

Piping and conduits that supply gas and/or liquids within buildings benefit from careful preparation. Builders or contractors typically use ladders or scaffolding to reach areas where piping is routed so installation may be cumbersome. Occasionally the pipe or conduits are prepared on the ground and installed by ladder as more complete assemblies. Pipe and conduit assemblies prepared on the ground or a floor of a building under construction are more unwieldy than the unassembled components, but pre-assembly is often more practical. Furthermore, conditions existing at construction sites and the number of differing types of components used in assembling a HVAC system render cataloging known HVAC components a challenge.

Generically, a terminal unit, also sometimes referred to as an air handling unit, is a HVAC system component that is located near an air conditioned space that regulates the temperature and/or volume of air supplied to the space. When providing air to a more critical environment such as a laboratory, an almost identical ductwork section is frequently referred to as a lab valve damper rather than as a terminal unit, with the distinction generally relating to the precision with which the unit controls the temperature and humidity of conditioned air. As used throughout this document, the phrase terminal unit encompasses either a terminal unit or a lab valve damper.

A HVAC system may be assembled using any one of several different types of terminal units. Generally, the mechanical portion of a terminal unit includes a casing through which air flows during operation of a HVAC system. Accordingly, the casing includes an inlet for receiving air from ductwork of a HVAC system, and an outlet for supplying air to a space in a building. Casings are usually fabricated from 22 gauge galvanized sheet steel. Due to the use of such light material, casings are easily damaged during shipping to a building site and during installation into the HVAC system. Those familiar with such damage to terminal unit casings frequently refer to it as "oil canning" because it resembles how a light gauge oil can collapses as the liquid flows out.

In a typical hydronic (all-water) HVAC system, the mechanical portion of a terminal unit includes a heat exchanging coil. Heated and/or cooled water is pumped from a central plant through pipes to the coil. Air from the HVAC system's ductwork passes through the coil after entering and before leaving the casing. Usually, a single terminal unit is dedicated for heating and/or cooling each air conditioned space. Air from the duct connected to the terminal unit passes through the coil to be heated and/or cooled by water flowing through the coil before the air enters the air conditioned space.

A Variable Air Volume ("VAV") HVAC system, in response to a control signal from a thermostat or room sensor, supplies only that volume of hot and/or cold air to an air conditioned space needed to satisfy the space's thermal load. A VAV HVAC system meets changing cooling and/or heating requirements by adjusting the amount, rather than the temperature, of air that flows to a space. For most buildings, a VAV HVAC system yields the best combination of comfort, first cost, and life cycle cost.

A VAV terminal unit is a relatively complex assembly which includes sheet metal, plumbing, electrical and pneumatic components. For example, a VAV terminal unit includes an airflow sensor that senses the velocity of air entering the terminal unit. To adjust the volume of cold air, a VAV terminal unit frequently includes a damper which automatically opens and closes as needed.

As a space's thermal load decreases, the damper starts closing thereby reducing the amount of heated or cooled air supplied to the space. Alternatively, the volume of air entering a space may be controlled by varying the speed of a fan included in the terminal unit. For either type of VAV terminal unit, VAV HVAC systems save energy consumed by fans in comparison with alternative HVAC systems by continually adjusting airflow to the heating and/or cooling required.

To be operable and fully-functional, terminal units for a hydronic HVAC system often include a coil, ductwork for supplying air to the coil and receiving air from the coil, plumbing for supplying water into and receiving water from the coil, and a control valve for regulating the amount of water flowing through the coil.

To match the flow of air through the terminal unit's ductwork to the profile of the coil, the terminal unit's ductwork may include transition sections both for air entering the coil and for air leaving the coil. In addition, a terminal unit may also include a re-heat coil, and/or a sound attenuator. In a terminal unit adapted for use in a VAV HVAC system, the terminal unit's ductwork may also include a damper and a damper actuator or variable speed fan for controlling the volume of air supplied by the terminal unit, and an airflow sensor for sensing the volume of air passing through the terminal unit.

Usually, all of the various parts needed to assemble a fully-functional VAV HVAC system's terminal unit arrive at building construction sites as separate components. Generally, these components are then assembled into a fully functional terminal unit at the construction site. Due to cluttered working conditions usually existing at a construction site where workers skilled in different crafts, e.g. plumbing, electrical, structural, etc., must concurrently collaborate to complete the building project, assembling the various components into a fully functional terminal unit may occupy the better part of a day. Furthermore, present practices and equipment are poorly adapted for swiftly constructing a high quality HVAC system that is easily commissioned.

For example, because it is less expensive to wire a HVAC system's terminal units with 24 volt low voltage electrical power rather than 220 or 110 volt power, presently sections of buildings include transformer trees which an electrician generally assembles by installing multiple step down transformers on an electrical panel. This technique permits wiring 220 or 110 volt electrical power to the transformer tree on each panel, with the 24 volt low voltage electrical power then being wired individually from a transformer on the panel over distances of five (5) to one hundred (100) feet to a terminal units for energizing its Direct Digital Control ("DDC") controller, and 2 way or 3 way automatic temperature control ("ATC") control valve.

Usually, terminal units are supported from a building using angle brackets, straps, or thread rod. Usually these support devices are attached directly to the terminal unit. Terminal unit casings are usually made using 22 gauge sheet metal. Due to the use of this light material, casings are easily dented or bent during installation.

With current construction site labor costing up to $80.00/hour or more, assembling a terminal unit at a construction site may cost $500.00 to $1,000.00 for labor alone. Furthermore, terminal units assembled at a construction site generally differ from one another due to assembly by different craftsmen, and insufficient use of identical components in assembling each terminal unit. Due to conditions existing at construction sites and the number of differing types of components used in assembling a HVAC system, cataloging the components used in assembling the system is impractical. Lastly, construction sites generally lack any facilities for individually pre-testing building components, such as terminal units, assembled on-site.

After assembling a HVAC system, it should be activated, tested and commissioned to ensure IAQ. Testing a HVAC system only after it is completely assembled inevitably results in many hours of problem-solving and leak-hunting. Usually, there are leaky joints, broken valves, damaged pipes, leaky coils and improperly assembled components that must be tracked down which further increases building costs. After finding a faulty component, it must be identified, ordered and replaced which takes time and delays completion of the building project. Furthermore, years after a building project is complete to maintain IAQ a building manager responsible for the HVAC system's maintenance will often have to identify and replace broken components.

The preceding considerations arising from construction site assembly of fully functional terminal units slows construction, increase building costs, requires rework when a terminal unit experiences an initial failure, and ultimately makes more difficult and expensive maintaining a building's HVAC system years after those responsible for its assembly are no longer available.

BRIEF SUMMARY OF THE INVENTION

An object is to provide improved HVAC devices, systems, and/or methods. Another object is to provide a zone-control unit for HVAC systems. Another object is to improve assembly of zone-control units for HVAC systems. Another object is to reduce the cost of zone-control units for HVAC systems. Another object is to reduce shipping and handling damage to HVAC system components. Another object is to provide modular components for assembling HVAC systems. Another object is to permit job site storage of assembled zone-control units before their installation into the HVAC system. Yet another object is to provide zone-control units for HVAC systems which are easier and simpler to install. Another object is to increase the serviceability of zone-control units for HVAC systems. Another object is to permit cataloging components used in assembling HVAC systems. Another object is to increase the serviceability of zone-control units for HVAC systems. Yet another object is to provide zone-control units for HVAC systems which may be commissioned more easily. Yet another object is to provide zone-control units for HVAC systems which are easier to maintain.

Advantageously, in some control system embodiments, dimensions of piping components are uniform regardless of the size of the heat exchanger. These may be a function of dimensional considerations and performance parameters. For example, different heat exchangers may have different face areas. The face area and the amount of heat exchanger surface can determine the British Thermal Units per Hour (BTUH) output for a particular heat exchanger. Often, current systems include piping and other components associated with heat exchangers that vary in size, dimension, and uniformity on a job site. Embodiments described herein allow for uniformity of portable piping structures. This can also facilitate cataloguing of the system or product, including detailed parts lists, dimensional and electrical drawings, and the like. There are also substantial manufacturing, technical, and financial advantages to such uniformity or standardization. Cataloguing and pre-manufacturing a control system with a portable piping structure allows for additional functionality to be added on at the factory thus further enhancing the product.

Advantageously, embodiments disclosed herein provide energy efficient control systems for maintaining room and other zone parameters to tight tolerances. Such systems can be configured to constantly adjust operational parameters so as to maintain a room setpoint. Systems and components thereof can be calibrated and programmed at the factory with baseline parameters, which can allow for building automation systems, front end computers, and software applications to adjust parameters automatically. Time frame and tolerance of adjustments can be a function of algorithms and programs written in the software. Trouble shooting can be done via readout at a thermostat or remotely via a wireless PDA.

According to one embodiment of the present invention, a fully-functional zone-control unit is adapted for facile inclusion in ductwork of a building's hydronic HVAC system. The fully-functional zone-control unit includes a conventional mechanical terminal unit through which air flows during operation of a HVAC system. The mechanical terminal unit includes a casing having an inlet for receiving air from ductwork of a HVAC system, and an outlet for supplying air to a space in a building. The mechanical terminal unit includes a coil through which air from ductwork passes upon entering the casing and before leaving the casing.

According to one embodiment of the present invention, the zone-control unit also includes an inlet piping assembly that is connected to the coil of the mechanical terminal unit. The inlet piping assembly has an end, separated from the connection to the coil, which is adapted for receiving water from the HVAC system's plumbing which the inlet piping assembly supplies to the coil. The fully-functional zone-control unit also includes an outlet piping assembly that is connected to the coil of the mechanical terminal unit for receiving water therefrom. The outlet piping assembly has an end, separated from the connection to the coil, which is adapted for supplying water, received from the coil, to the HVAC system's plumbing. The fully-functional zone-control unit further includes a structure that mechanically couples together the mechanical terminal unit, the inlet piping assembly, and the outlet piping assembly. The structure also includes at least one handle so the fully-functional zone-control unit may be conveniently and safely handled both during shipping, and during installation into a HVAC system.

In another embodiment of the fully-functional zone-control unit, the inlet and outlet piping assemblies respectively pass through a pair of holes that pierce each of the handles. Furthermore, each of the handles includes a pair of grommets respectively installed in each of the holes which fit snugly around the piping assemblies where they pass through the handles.

In another embodiment, prior to installation into a HVAC system the fully-functional zone-control unit also includes a pair of caps respectively sealing the ends of the piping assemblies, and a pressure gauge for sensing pressurization of the piping assemblies and coil which the caps seal. Sealing the piping assemblies and coil and connecting a pressure gauge permits testing them to assure that there are no leaks, and readily assessing that fully-functional zone-control units remain leak free until they are about to be installed into a building's HVAC system.

In one aspect, the present invention provides a zone-control unit adapted for inclusion in ductwork of a hydronic heating, ventilation, and air conditioning ("HVAC") system of a building. The zone-control unit may include a mechanical terminal unit through which air flows during operation of a HVAC system. The mechanical terminal unit may include a casing having an inlet for receiving air from ductwork of a HVAC system, and an outlet for supplying air to a space in a building. The mechanical terminal unit may also include a coil through which air from ductwork passes upon entering the casing and before leaving the casing. The zone-control unit may also include an inlet piping assembly that is connected to the coil of the mechanical terminal unit, and has an end, separated from the connection to the coil, which is adapted for receiving water from plumbing of the HVAC system which the inlet piping assembly supplies to the coil. The zone-control unit may also include an outlet piping assembly that is connected to the coil of the mechanical terminal unit for receiving water therefrom, and an end, separated from the connection to the coil, which is adapted for supplying water, received from the coil, to plumbing of the HVAC system. The zone-control unit may also include a structure, having at least one handle, that mechanically couples together the mechanical terminal unit, the inlet piping assembly, and the outlet piping assembly, such that the zone-control unit may be conveniently and safely handled both during shipping, and installation into a HVAC system.

In some aspects, the casing of the mechanical terminal unit may include a damper assembly for controlling air which flows through the casing. The zone-control unit may also include a controller for controlling operation of the damper assembly. The controller may be a Direct Digital Control ("DDC") controller. The zone-control unit may also include a length of Local Area Network ("LAN") cable that is coupled to the DDC controller for connecting the DDC controller to a LAN. In some cases, the zone-control unit may also include a length of electrical wire that is coupled to the DDC controller for connecting the DDC controller to a temperature sensor. In related aspects, the combined inlet and outlet piping assemblies of the zone-control unit may include an automatic temperature control ("ATC") control valve, and an electrical signal supplied to the ATC control valve from the DDC controller can energize operation of the ATC control valve.

In another aspect, the casing of the mechanical terminal unit may include a variable speed fan for controlling air which flows through the casing. In some aspects, the structure that mechanically couples together the mechanical terminal unit, the inlet piping assembly and the outlet piping assembly can include a plate that is pierced by a pair of apertures through which the inlet piping assembly and the outlet piping assembly respectively pass. An aperture piercing the plate may receive a grommet, such that a first grommet is received into a first of the apertures and fitted snugly around the inlet piping assembly where the inlet piping assembly passes through the plate, and a second grommet is received into a second of the apertures and fitted snugly around the outlet piping assembly where the outlet piping assembly passes through the plate. The plate may also be pierced by another aperture which adapts the structure for providing convenient and safe handling of the zone-control unit. The zone-control unit may also include a cradle that becomes disposed beneath the mechanical terminal unit, the inlet piping assembly and the outlet piping assembly when the zone-control unit is installed in a HVAC system. The structure that mechanically couples together the mechanical terminal unit, the inlet piping assembly and the outlet piping assembly can also include a sleeve mounting bracket which surrounds the casing of the mechanical terminal unit, and the plate may be coupled to the mechanical terminal unit by being fastened to the sleeve mounting bracket. Relatedly, the sleeve mounting bracket may include at least one hanging plate adapted for suspending the zone-control unit when the zone-control unit is installed in a HVAC system. In some aspects, a sleeve mounting bracket surrounding the casing of the mechanical terminal unit may include at least a portion of a hanger that is adapted for suspending the zone-control unit when the zone-control unit is installed in a HVAC system. In some aspects, the structure that mechanically couples together the mechanical terminal unit, the inlet piping assembly and the outlet piping assembly may also include a columnar mounting bracket which is secured to the casing of the mechanical terminal unit, and the plate may be coupled to the mechanical terminal unit by being fastened to the columnar mounting bracket. The columnar mounting bracket may include a hanging plate adapted for suspending the zone-control unit when the zone-control unit is installed in a HVAC system. In some cases, a plate included in the structure that mechanically couples together the mechanical terminal unit, the inlet piping assembly and the outlet piping assembly may be secured to the cradle. The cradle may be pierced by an aperture for providing convenient and safe handling of the zone-control unit.

In another aspect, the zone-control unit may include a shield for protecting tubes of the coil from damage during shipping and during installation into a HVAC system. In some aspects, the zone-control unit may include a pair of caps respectively sealing ends of the inlet piping assembly and of the outlet piping assembly, and a pressure gauge for sensing pressurization of the inlet piping assembly, coil and outlet piping assembly which the caps seal. The zone-control unit may also include a pair of flexible hoses respectively connected to ends of the inlet piping assembly and of the outlet piping assembly for facilitating coupling the inlet piping assembly and outlet piping assembly to plumbing of the HVAC system which supplies water to and receives water from the coil of the zone-control unit. Similarly, the zone-control unit may include a pair of valves which are respectively connected to ends of the flexible hoses disposed away from the ends of the inlet piping assembly and of the outlet piping assembly to which the flexible hoses connect, and a pressure gauge for sensing pressurization of the inlet piping assembly, coil and outlet piping assembly which may be sealed by the valves. The zone-control unit may also include a pair of tees which are respectively connected to each of the valves furthest from ends of the flexible hoses to which the valves connect.

In one embodiment, the zone-control unit of the present invention includes identifying tags attached to components of inlet and outlet piping assemblies that are likely to eventually require replacement. The zone-control unit may also have an enclosure which contains components of the zone-control unit. Relatedly, components of the zone-control unit contained within the enclosure may include a transformer and a DDC controller. The enclosure may protect the components from environmental hazards such as falling dirt, rain, sleet, snow, windblown dust, splashing water, hose-directed water and internal explosions. Further, the zone-control unit may include a length of LAN cable that is coupled to the DDC controller for connecting the DDC controller to a LAN. In some aspects, the zone-control unit may include a length of electrical wire that is coupled to the DDC controller for connecting the DDC controller to a temperature sensor. Combined inlet and outlet piping assemblies of the zone-control unit may include an ATC control valve, and an electrical signal supplied to the ATC control valve from the DDC controller may energize operation of the ATC control valve. The zone-control unit may also include a service lamp adapted for facilitating inspection of the zone-control unit. In some aspects, the zone-control unit may include a switched power outlet adapted for providing a source of electrical power at the zone-control unit for use when servicing the zone-control unit.

In another aspect, the present invention provides a unit for inclusion in a heating, ventilation, and air conditioning ("HVAC") system of a building, where the HVAC system includes a coil. The unit may include an inlet piping assembly having a first end adapted for connection to the coil and a second end for receiving fluid for the coil, an outlet piping assembly having a first end adapted for connection to the coil and a second end for fluid flowing from the coil, a control valve disposed along the inlet piping of the outlet piping, the control valve operable in response to an electrical signal, and a shipping and installation structure supporting the inlet piping, the outlet piping, and the control valve with relative positions appropriate for use in the HVAC system. In another aspect, the unit may include a mechanical terminal unit having ductwork for transmitting air therethrough and a coil in thermal communication with the air passing through the ductwork, an inlet piping assembly having a first end connected to the coil and a sealed second end, an outlet piping assembly having a first end adapted connected to the coil and a sealed second end, a fluid disposed along a sealed fluid path between the sealed end of the inlet piping and the sealed end of the outlet piping, the fluid having a pressure, a shipping and installation structure supporting the inlet piping, the outlet piping, and the mechanical terminal unit, and a pressure gauge along the sealed fluid path and supported by the structure so as to indicate the pressure and verify sealing of the sealed fluid path before and after shipping.

In one aspect, the present invention provides a zone-control unit for use in a heating, ventilation, and air conditioning (HVAC) system. The zone-control unit can include a casing, a coil disposed within the casing, an inlet piping assembly coupled with the coil for supplying liquid or gas to the coil, an outlet piping assembly coupled with the coil for receiving liquid or gas from the coil, a handle that maintains the casing, the inlet piping assembly, and the outlet piping assembly in positional relationship. The unit can also include a damper assembly controller coupled with the casing, where the damper assembly controller is configured to receive a signal from a thermostat or a room sensor. In some aspects, the damper assembly controller can include a direct digital control (DDC) controller. Relatedly, the damper assembly controller can be equipped with Local Area Network (LAN) communication capability. In some aspects, the zone-control unit can include an automatic temperature control (ATC) valve configured to receive a signal from the damper assembly controller. The zone-control unit may also include an enclosure, where the ATC valve and at least a portion of the handle are disposed within the enclosure, such that the handle is accessible for transportation or shipping. The damper assembly controller may be coupled with an on-off switch, a transformer, or both. Relatedly, the damper assembly may be coupled with a transformer, and the transformer can be coupled with a 110 volt cord having a male plug. In another aspect, the zone-control unit can include a housing, where the damper assembly controller is disposed within the housing. The zone-control unit may also include a variable speed fan disposed within the casing. In some instances, the zone-control unit may include a cradle coupled with the handle. The unit may also include a sleeve mounting bracket coupled with the casing. In a related aspect, at least one of the coil, the inlet piping assembly, or the outlet piping assembly may be coupled with a pressure gauge, a drain, or a vent. The inlet piping assembly and the outlet piping assembly may be sealed, and the coil, the inlet piping assembly, and the outlet piping assembly may be pressurized. In some instances, the inlet piping assembly may be coupled with an inlet hose by a inlet fitting, and the outlet piping assembly may be coupled with an outlet hose by a outlet fitting.

In still another aspect, a zone-control unit of the present invention may include a thermal transfer assembly having a supply port and a return port, an inlet piping assembly having a first passage coupled with the thermal transfer assembly supply port and a second passage coupleable with an upstream fluid source, an outlet piping assembly having a first passage coupled with the thermal transfer assembly return port and a second passage coupleable with a downstream fluid destination, a duct interface, and a bracket supporting the duct interface, the inlet piping assembly, and the outlet piping assembly with relative positions appropriate for use in the climate control system. In some aspects, the inlet piping assembly second passage and the outlet piping assembly second passage may each be sealed, the inlet piping assembly first passage may be in sealed communication with the thermal transfer assembly supply port, and the outlet piping assembly first passage may be in sealed communication with the thermal transfer assembly return port. Relatedly, the thermal transfer unit may contain a vacuum, a non-pressurized fluid, or a pressurized fluid. In some aspects, the unit may further include a pressure gauge, and the pressure gauge may be coupled with the thermal transfer assembly, the inlet piping assembly, or the outlet piping assembly. The inlet piping assembly may be coupled with a drain, a strainer, a pressure gauge, a pressure/temperature port, or a supply shutoff valve. The outlet piping assembly may be coupled with a control valve, a balancing valve, a vent, a pressure gauge, a pressure/temperature port, or a return shutoff valve. In some aspects, the duct interface is coupleable with a duct of the HVAC system, such that the duct houses at least a portion of the thermal transfer unit. The zone-control unit may also include a bypass piping assembly coupling the inlet piping assembly with the outlet piping assembly.

In another aspect according to the present invention, the zone-control unit may comply with a standard such as a Leadership in Energy and Environmental Design (LEED) standard, an American Society of Heating, Refrigerating, and Air Conditioning Engineers (ASHRAE) standard, or a building code standard. In some aspects, the inlet piping second passage or the outlet piping second passage may be coupled with a hose via a press-fitting joint. Relatedly, the press-fitting joint may comply with an appropriate standard. In some aspects, the zone-control unit may include a validation package, which may have a digital picture of the zone-control unit, a completed quality control sheet, an operations and maintenance document, a parts list with model number, an Indoor Air Quality (IAQ) certification, or a piping, electrical, and controls schematic.

In one aspect, the present invention provides a method of installing a zone-control unit for use in an HVAC system. The method can include engaging a handle of the zone-control unit, where the zone-control unit includes a casing, a coil disposed within the casing, an inlet piping assembly coupled with the coil for supplying liquid or gas to the coil, an outlet piping assembly coupled with the coil for receiving liquid or gas from the coil, a handle that maintains the casing, the inlet piping assembly, and the outlet piping assembly in positional relationship, and a damper assembly controller coupled with the casing. The method can also include maneuvering the handle so as to position the zone-control unit in a desired location and orientation, coupling the inlet piping assembly with piping of the HVAC system, and coupling the outlet piping assembly with piping of the HVAC system.

In another aspect, the present invention provides a method of preparing a zone-control unit for delivery to a construction site for installation in a heating, ventilation, and air conditioning (HVAC) system. The method can include coupling a coil with an inlet piping assembly and an outlet piping assembly, placing the coil within a casing, and coupling a handle with the casing, the inlet piping assembly, and the outlet piping assembly so as to maintain the casing, the inlet piping assembly, and the outlet piping assembly in positional relationship. The method can also include coupling a damper assembly controller with the casing, sealing the inlet piping assembly and the outlet piping assembly, and pressurizing the coil, the inlet piping assembly, and the outlet piping assembly. In related aspects, the method may include testing the coil, the inlet piping assembly, and the outlet piping assembly for leaks. The method may also include wrapping the zone-control unit to reduce contamination. Such protection measures may include applying shrink wrap, plastic wrap, or the like to the unit prior to shipping or installation, so as to provide a measure of protection from dust or other contaminants. In some aspects, the preparation is performed by a union member selected from a group such as the United Association of Journeymen and Apprentices of the Plumbing and Pipefitting Industry of the United States and Canada, a construction sheet metal union, and an electrician's union, and/or at a facility or by a company certified or approved by such a union.

In yet another aspect, the present invention provides a piping and coil assembly for transporting liquid or gas in a heating, ventilation, and air conditioning (HVAC) system. The piping and coil combination assembly can include a coil, an inlet piping assembly coupled with the coil for supplying liquid or gas to the coil, an outlet piping assembly coupled with the coil for receiving liquid or gas from the coil, and a handle that maintains the coil, the inlet piping assembly, and the outlet piping assembly in positional relationship.

The methods and apparatuses of the present invention may be provided in one or more kits for such use. For example, the kits may comprise a system for use in an HVAC system. Optionally, such kits may further include any of the other system components described in relation to the present invention and any other materials or items relevant to the present invention. The instructions for use can set forth any of the methods as described herein. It is further understood that systems according to the present invention may be configured to carry out any of the method steps described herein.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 6 is a perspective view of an alternative embodiment fully-functional zone-control unit in accordance with the present disclosure, similar to that depicted in FIG. 1, which includes a pair of sleeve mounting brackets that surround the casing, and support the zone-control unit when it is installed in a HVAC system.

FIG. 7 is an exploded perspective view of one of the zone-control unit mounting brackets depicted in FIG. 6.

FIG. 8 is an elevational view taken along a line 8-8 in FIG. 7. illustrating mating of a pair of handles included in the zone-control unit mounting bracket depicted in FIGS. 6 and 7.

FIG. 9 is a perspective view of another alternative embodiment fully-functional zone-control unit in accordance with the present disclosure, similar to that depicted in FIG. 1, which includes four columnar mounting brackets that are secured to the casing, and support the zone-control unit when it is installed in a HVAC system.

DETAILED DESCRIPTION OF THE INVENTION

Figure 1:
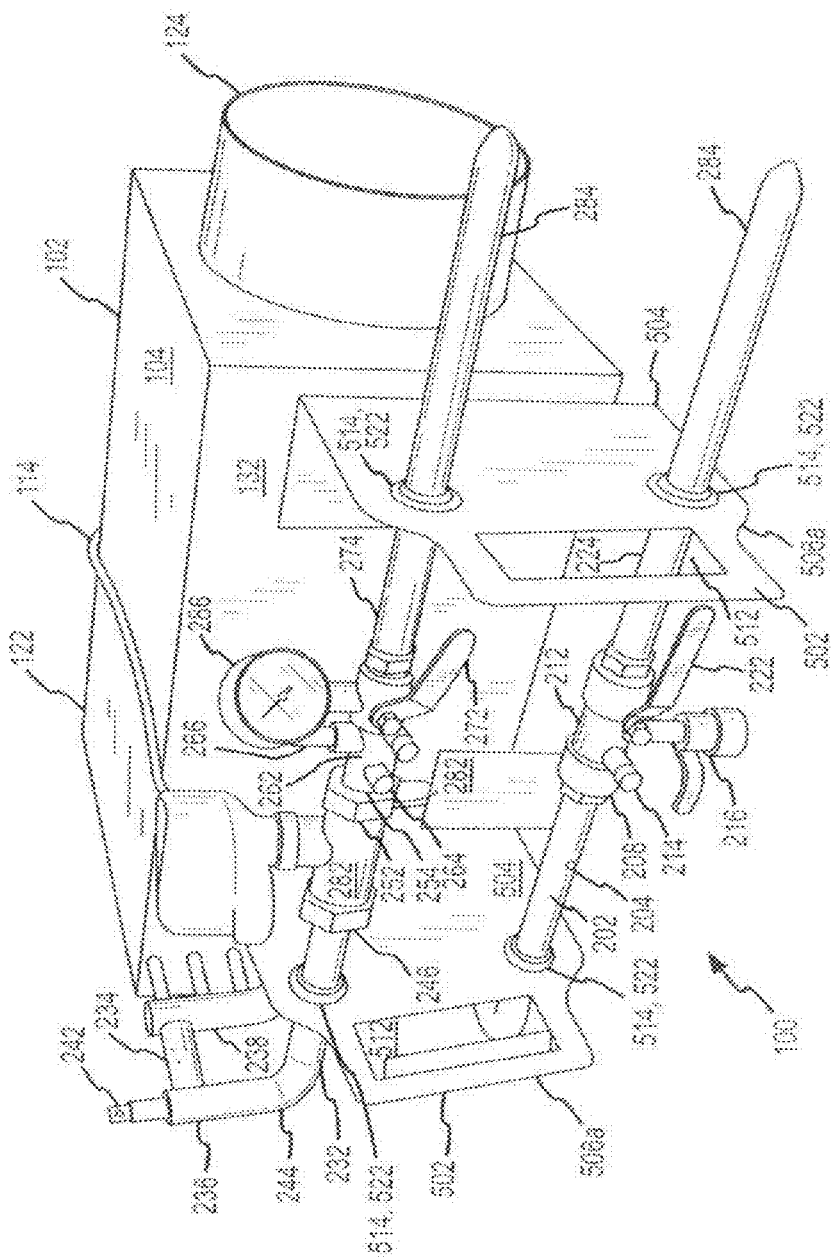
FIG. 1 is a perspective view of an fully-functional zone-control unit ready for installation in a HVAC system which includes a zone-control unit having a casing from which a pair of handles project for supporting inlet and outlet piping assemblies included in the fully-functional zone-control unit, according to one embodiment of the present invention.

The perspective view of FIG. 1 illustrates a fully-functional HVAC terminal unit referred to by the general reference character 100. The fully-functional zone-control unit 100 depicted in FIG. 1, which illustrates one embodiment of the present invention, preferably includes a mechanical terminal unit 102 having a casing 104 visible in FIG. 1. The casing 104, which can be made from various materials of differing thicknesses, is frequently made from galvanized sheet steel material. Frequently, the casing 104 is lined with a thermal insulation material, not visible in FIG. 1, which may be chosen from various different types such as fiberglass insulation, rigid duct board fiber insulation, polyolefin, closed cell, foam insulation, etc. In some embodiments, insulation contained in zone-control unit 100 complies with an industry standard, such as a standard set by the Office of Statewide Health and Planning Department (OSHPOD).

For VAV zone-control units 100, the mechanical terminal unit 102 preferably includes a damper assembly, not visible in FIG. 1. The damper assembly is supported for rotation within the casing 104 by a shaft which extends through and beyond the casing 104. The mechanical terminal unit 102 of a zone-control unit 100 that includes the damper assembly also includes a DDC controller 112 depicted in FIG. 3. The DDC controller 112 is coupled to a damper motor, not visible in any of the figures, which rotates the damper assembly. The DDC controller 112 receives a signal from a thermostat or room sensor and responsive thereto controls operation of the damper assembly to regulate the amount of heating or cooling provided by air leaving the zone-control unit 100. The DDC controller 112 may be selected from various different types such as pneumatic, analog electronic or direct digital electronic. The mechanical terminal unit 102 also includes an airflow sensor, also not visible in FIG. 1, which is usually located near an air inlet to the casing 104 and may be selected from various types for sensing the velocity of air entering the casing 104.

To heat or cool air flowing through the mechanical terminal unit 102, the casing 104 includes a coil 122 that is located near the air inlet thereto, and which adapts the mechanical terminal unit 102 for inclusion in a hydronic HVAC system. The casing 104 includes both an inlet collar, not visible in FIG. 1, and an outlet connection 124 each of which is adapted to mate with a building's HVAC ductwork. If a zone-control unit 100 were to be assembled at a construction site, the mechanical terminal unit 102 would arrive there with the various components listed above mostly assembled, other than the DDC controller 112 and the damper motor, by the terminal unit's manufacturer.

The mechanical terminal unit 102 is preferably selected from among various different types and styles sold by Krueger based in Richardson, Tex. Krueger is a division of Air Systems Components (ASC) which is part of the Dayton, Ohio Air System Components Division of Tomkins Industries, Inc. of London, England.

To fashion the mechanical terminal unit 102 into a zone-control unit 100 ready for installation into a building's HVAC system, various plumbing components must be added for circulating either hot or cold water through the coil 122. For supplying water to the coil 122 the zone-control unit 100 includes an inlet piping assembly 202. The piping assembly 202 includes an L-shaped section of pipe 204 which connects at one end to a lower header of the coil 122, not visible in FIG. 1. At its other end, the pipe 204 ends at a union 208. The other half of the union 208 connects to a tailpiece 212 which receives both a pressure/temperature ("P/T") port 214 and a drain 216. The drain 216 includes a ball valve integrated ¾" male garden hose end connection to facilitate draining the coil 122 when maintenance or repairs become necessary. A ball valve 222, which includes a strainer, connects to a side of the tailpiece 212 away from the union 208 to permit stopping hot or cold water from circulating through the coil 122. An opposite side of the valve 222 from the tailpiece 212 receives a length of pipe 224 which adapts the piping assembly 202 for connecting to a building's plumbing.

The zone-control unit 100 also includes an outlet piping assembly 232 for receiving water from the coil 122. A short length of pipe 234 which ends in a tee 236 connects to an header 238 of the coil 122. A manual air vent 242 is connected to and projects upward above the tee 236 to facilitate eliminating air from the piping assemblies 202, 232 following first assembling the HVAC system, or reassembly of the zone-control unit 100 when maintenance or repairs become necessary. An L-shaped section of pipe 244 is connected to and depends below the tee 236. Similar to the pipe 204, an end of the pipe 244 furthest from the tee 236 ends at a union 246. The other half of the union 246 connects to a 2 way or 3 way ATC control valve 252. The ATC control valve 252 may either be of a type depicted in FIG. 1 that provides only on-off control, or be of a type that provides proportional control, not illustrated in any of the FIGs. An electrical signal supplied to the ATC control valve 252 from the DDC controller 112 via a control signal cable 114 energize operation of the ATC control valve 252.

A side of the ATC control valve 252 furthest from the union 246 connects to a union 254. Connecting the ATC control valve 252 into the piping assembly 232 on both sides with unions 246, 254 facilitates its replacement when maintenance or repairs become necessary. A tailpiece 262, connected to the other side of the union 254 furthest from the ATC control valve 252, receives both a P/T port 264 and a manual air vent 266. The P/T ports 214 and 264 facilitate measuring pressure and/or temperature of water circulating through the coil 122. The vent 266 facilitates eliminating air from the piping assembly 232 following first assembling the HVAC system, or reassembly of the zone-control unit 100 when maintenance or repairs become necessary. A manual balancing valve 272 connects to the other side of the tailpiece 262 from the furthest from the union 254. An opposite side of the valve 272 from the tailpiece 262 receives a length of pipe 274 which, similar to the pipe 224, adapts the piping assembly 232 for connecting to a building's plumbing. The valves 222, 216, 272 and other plumbing fittings included in the piping assemblies 202, 232 are preferably manufactured by HCI of Madison Heights, Mich. The valves 222, 272 permit isolating from the building's plumbing, when maintenance or repairs become necessary, the coil 122 and those portions of the piping assemblies 202, 232 which connect to the valves 222, 272.

As described thus far, the zone-control unit 100 including the piping assemblies 202, 232 are substantially the same as those which a skilled sheet metal worker, controls contractor, electrician, and pipe fitter might collectively assemble at a building site. However, in assembling zone-control units 100 in accordance with the present invention for a particular building project or significant portion thereof, all of the lengths of pipe, plumbing fittings, valves, vents, P/T ports, etc. are the same. Consequently, when a repair become necessary a building manager or the manager's personnel responsible for maintaining the HVAC system may confidently order a replacement part knowing that it will surely fit because the plumbing of each zone-control unit 100 is not unique. Rather, in accordance with the present invention the plumbing of zone-control units 100 is uniform throughout the building or significant portion thereof. Furthermore, because plumbing of zone-control units 100 is uniform throughout the building or significant portion thereof, acting either from prudence or caution a building manager may confidently maintain an inventory of plumbing components for the zone-control units 100 to have on hand when they need repair thereby significantly reducing downtime while also maintaining IAQ.

In addition to being assembled with uniform plumbing, in accordance with the present invention tags 282 are attached to each valve 252, 272 or other component that are likely to eventually require replacement. After the HVAC system has been commissioned, when a failure occurs and is located, the presence of an identifying tag 282 attached to a failed component simplifies its replacement and reduces the time required therefor. The tags 282 are particularly helpful if components from different manufacturers and/or different catalogs have been incorporated into the HVAC system. The tags 282 are preferably engraved plastic, but may also be made from metal, paper, or any other appropriate material. The tags 282 may carry barcodes or plain language, for example, and may be customized to provide information in the manner most useful for a particular project. In accordance with the present invention, performance requirements for each zone-control unit 100 such as GPM, CFM, CV and so on are marked thereon in an accessible and well defined location.

Also in accordance with embodiments of the present invention, each pipe 224, 274 is sealed by a spun copper cap 284 which is five (5) times thicker than the pipe 224, 274, and the assembled piping assemblies 202, 232 include a pressure gauge 286. Following fabrication and sealing of the piping assemblies 202, 232, they are pressure tested with, for example, a gas such as air. Other gasses or a liquid may be used as appropriate for materials used in the piping assemblies 202, 232. A typical pressure range used in testing assembled piping assemblies 202, 232 and coil 122 is 20-400 psi, and in one embodiment is preferably 140 psi. While pressurized, the piping assemblies 202, 232 and the coil 122 are checked for leaks, e.g. with a soap solution. Any defects in assembly found during pressure testing are repaired and/or defective components replaced. For example, experience in assembling zone-control units 100 in accordance with embodiments of the present invention indicates that about 3 to 7% of new coils 122 are defective and must be replaced.

When inspection and pressure testing indicates that no leaks appear to exist in the piping assemblies 202, 232 and the coil 122, they are then sealed and re-pressurized to at least 100 psi, preferably 140 psi, or any other desired negative or positive pressure, including a vacuum. After pressurization, the piping assemblies 202, 232 and the coil 122 remain sealed for 24 hours throughout which they must hold the pressurization to confirm that the zone-control unit 100 is undergoing installation into a HVAC system. After the piping assemblies 202, 232 and the coil 122 pass this 24 hour quality assurance test, zone-control units 100 can be ready for shipping to a construction site. In accordance with one embodiment of the present invention, the piping assemblies 202, 232 and coil 122 of zone-control units 100 ready for installation remain pressurized continuously after their 24 hour quality assurance test at a pressure of at least 60 psi until they are about to be installed into a building's HVAC system. In some cases, the shipping pressure can be 40 psi, or any other desired pressure.

Immediately before installing a zone-control unit 100 at a construction site, their readiness for installation can be confirmed by checking the pressure gauge 286. If the pressure gauge 286 fails to indicate a specified pressure, then the zone-control unit 100 may need further testing and/or repair, and should not be installed into the HVAC system. Instead an identically assembled zone-control unit 100 having a pressure gauge 286 which indicates the specified pressure may be immediately substituted for a defective one, and the defective zone-control unit 100 may either be repaired and re-tested at the construction site, or it may be returned to its vendor for repair.

Identifying and replacing faulty piping assemblies 202, 232 and/or coil 122 in this way prior to installing the zone-control unit 100 saves time and money. The present invention can eliminate an inability to test the piping assemblies 202, 232 and coil 122 of each zone-control unit 100 assembled at a construction site until the entire HVAC system is completely assembled and ready for commissioning. Off-site assembly and testing of zone-control units 100, rather than assembling the components at the construction site, improves quality control by individually assuring that each zone-control unit 100 is ready for installation in a HVAC system. In this way the present invention saves time and money that would otherwise be spent tracking down leaks that occur using traditional on-site assembly of zone-control units 100. Furthermore, by preventing pinhole leaks in the zone-control unit 100, which inevitably result in mold, biochemical hazards, etc., the present invention significantly improves IAQ both initially and throughout the HVAC system's service life. Relatedly, insulation can be applied to or incorporated into a zone-control unit or portable piping structure at the factory, instead of in the field or at the job site. Thus, units or structures can be made at the factory, pre-assembled, pre-calibrated, and pre-insulated, thus providing further cost savings and efficiencies.

One problem which arises with assembling zone-control units 100 at a location remote from a construction site is that during their transportation to the site and during installation into a building's ductwork zone-control units 100 may be manipulated by the piping assemblies 202, 232 and/or the coil 122 of the mechanical terminal unit 102. Such handling of zone-control units 100 during installation may damage seals between the components as well as the components themselves. Furthermore, such damage may not be noticed until the HVAC system is pressurized for commissioning or at a later date. At that time, locating a leak or malfunctioning part may be time-consuming, virtually impossible and cost prohibitive. To reduce any possibility that a zone-control unit 100 might be damaged while being transported from its assembly, test and qualification location to a construction site and to facilitate handling the zone-control unit 100 during its installation into the HVAC system, in accordance with the embodiment of the present invention illustrated in FIG. 1 each zone-control unit 100 also includes a pair of handles 502 that are preferably secured to the casing 104 of the mechanical terminal unit 102 near opposite ends thereof.

Figure 2:
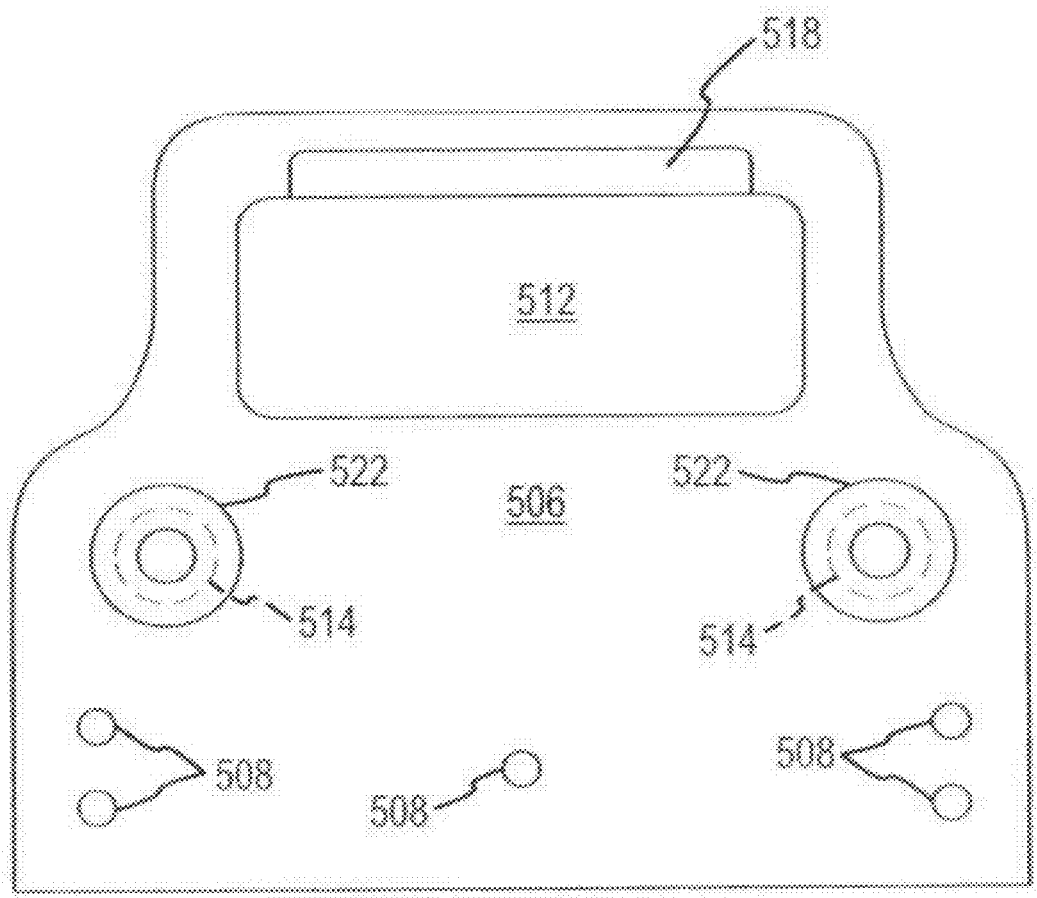
FIG. 2 is an elevational view of a plate that is included in the handles illustrated in FIG. 1 which project from the zone-control unit's casing and support the piping assemblies, according to one embodiment of the present invention.

Each of the handles 502 includes an L-shaped handle mounting bracket 504 which is rigidly secured to a wall 132 of the mechanical terminal unit 102 which is nearest to the piping assemblies 202, 232. As depicted in FIG. 1, the handle mounting brackets 504 are secured near opposite ends of the wall 132 of the zone-control unit's casing 104. Each of the handles 502, for example illustrated in FIG. 2, is formed by a plate 506a of sheet metal. Each plate 506a include a plurality of holes 508 through which fasteners pass for securing the plate 506a to a portion of the handle mounting bracket 504 that projects outward from the wall 132. The handle mounting brackets 504 and the plates 506a can be made from 12 gauge sheet steel. The handle mounting brackets 504 can be galvanized and the plates 506a can be powder coated, and can be made from various materials and gauge sizes.

For use with the zone-control unit 100, each plate 506a is also pierced by a rectangularly-shaped hole 512, and by a pair of circularly-shaped holes 514 illustrated with dashed lines in FIG. 2. The holes 512 are large enough to accept many lifting devices including human hands, forklift, Unistrut, pipe or other lifting device. Each hole 512 has a curved edge 518 to prevent hand injuries, and may lack any sharp edges or non-rolled edges. The holes 514 each receive a grommet 522 that fits snugly around the piping assemblies 202, 232 where they pass through plates 506a.

Arranged in this way, the handle mounting brackets 504 and plates 506a provide a structure for mechanically coupling the mechanical terminal unit 102 and the piping assemblies 202, 232 together thereby reducing any possibility that the zone-control unit 100 might be damaged while being transported from its assembly, test and qualification location to a construction site. Furthermore, the handles 502 protect zone-control units 100 during shipping, and facilitate their handling during installation into the HVAC system such as maneuvering zone-control units 100 into position in a building's ductwork. During installation, the handle mounting brackets 504 and plates 506a maintain positional relationships between the mechanical terminal unit 102 including the coil 122 and the piping assemblies 202, 232 because the handle mounting brackets 504 and plates 506a mechanically bind the entire zone-control unit 100 together into a single unit.

In renovating existing buildings by adding an up-to-date HVAC system, sometimes there exists no interior space for installing zone-control units 100. To permit installing zone-control units 100 on a renovated building's roof where its components are exposed to environmental hazards, an alternative embodiment of the zone-control unit 100, depicted in FIG. 3, includes a weatherproof NEMA enclosure 552. For this alternative embodiment zone-control unit 100, all of the electrical components together with their wiring are located within the NEMA enclosure 552, and outdoor grade conduit 554 encloses the cable 114 that interconnects the DDC controller 112 and the ATC control valve 252. Accordingly, in addition to the DDC controller 112, the NEMA enclosure 552 also encloses a on-off switch 562 and a transformer 564 for supplying 24 volt electrical power to the DDC controller 112.

Cooling for the components of the mechanical terminal unit 102 enclosed within the NEMA enclosure 552 may be provided by a mini-fan mounted within the NEMA enclosure 552. Alternatively, these components of the mechanical terminal unit 102 may be cooled by air flowing through the HVAC system's ductwork. For example, one end of a small duct may be connected into the plenum upstream from the coil 122 with the other end connecting to the NEMA enclosure 552. The ATC control valve 252 may also be cooled by enclosing it and connecting its enclosure to the HVAC system's plenum by a small duct. If the electrical wires connecting the coil 122 to the ATC control valve 252 are enclosed within a one (1) inch diameter outdoor grade conduit 554, cool air first supplied to the ATC control valve 252 flows to the NEMA enclosure 552 through the outdoor grade conduit 554.

The NEMA enclosure 552 may be selected from among NEMA Type 3R, 4 or 10 enclosures. NEMA Type 3R, 4 or 10 enclosures all provide a degree of protection for personnel against incidental contact with equipment enclosed therein. NEMA Type 3R enclosures are constructed for either indoor or outdoor use providing a degree of protection against falling dirt, rain, sleet, and snow, and are undamaged by the external formation of ice on the enclosure. NEMA Type 4 enclosures are also constructed for either indoor or outdoor use again providing a degree of protection against falling dirt, rain, sleet, snow, windblown dust, splashing water, and hose-directed water, and are also undamaged by the external formation of ice on the enclosure. NEMA Type 10 enclosures are designed to contain an internal explosion without causing an external hazard, i.e. NEMA Type 10 enclosures meet the requirements of the Mine Safety and Health Administration, 30 CFR, Part 18.

Figure 3:
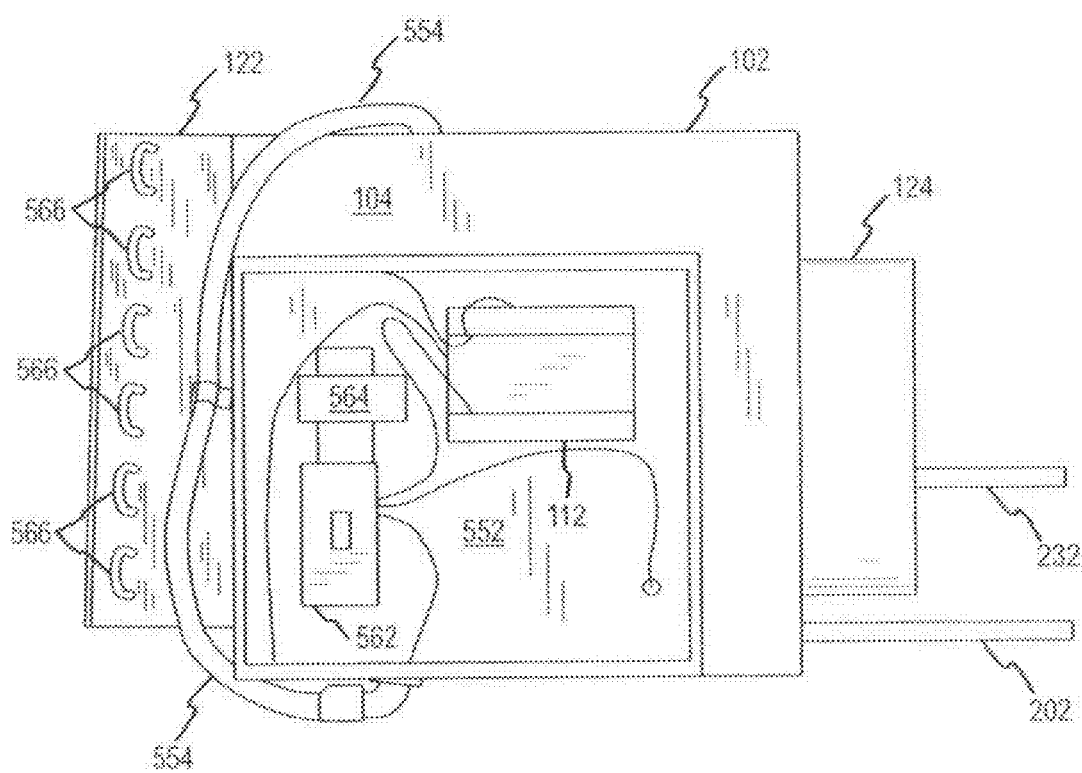
FIG. 3 is a perspective view of an alternative embodiment, fully-functional zone-control unit which includes a NEMA enclosure that adapts the unit for installation outside a building, according to one embodiment of the present invention.
Figure 4:
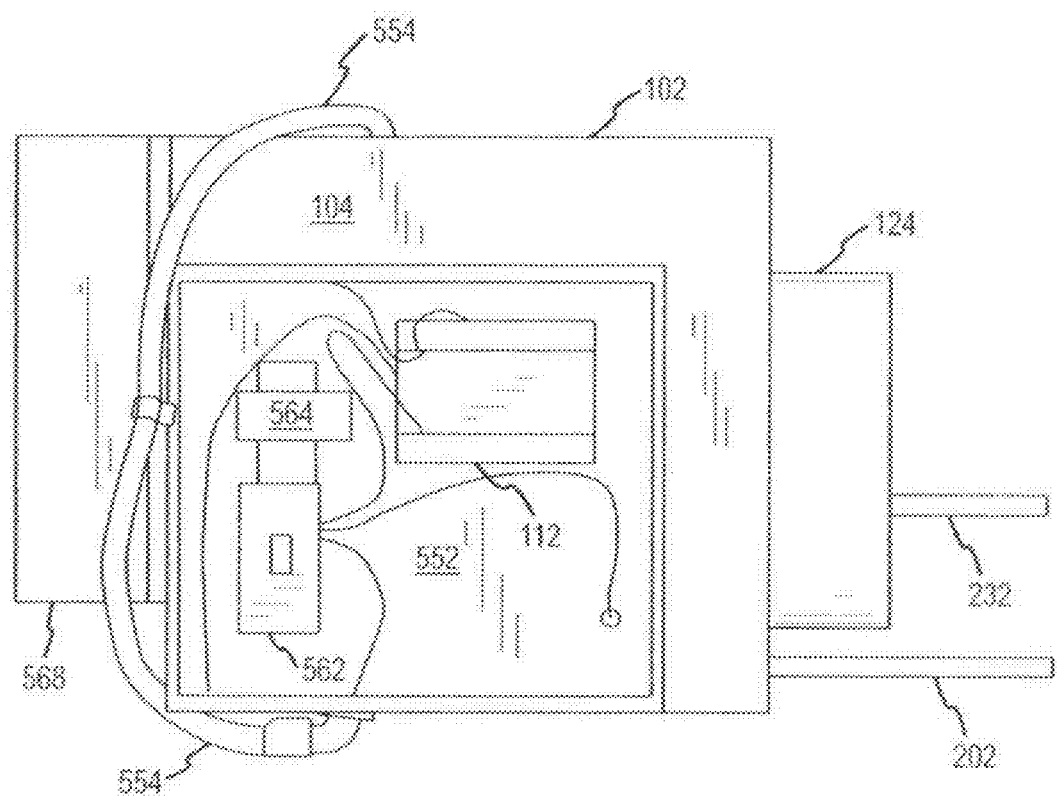
FIG. 4 is a perspective view of the alternative embodiment, fully-functional zone-control unit of FIG. 3 that includes a shield which protects coils included in the casing from mechanical damage, according to one embodiment of the present invention.

As described thus far, zone-control units 100 have exposed U-shaped portions 566 of tubes, best illustrated in FIG. 3, through which water circulates that are located at the end of the coil 122 furthest from the piping assemblies 202, 232. To reduce the possibility that the exposed U-shaped portions 566 of these tubes might be damaged either during transportation of the zone-control unit 100 and/or its installation into a HVAC system, as illustrated in FIG. 4 an alternative embodiment of the zone-control unit 100 includes a shield 568 preferably made from sheet steel material.

The shield 568 is secured to the coil 122 and perhaps also the casing 104, and covers the U-shaped portions 566 of tubes included in the coil 122. Though not illustrated in FIG. 4, the shield 568 may be lined with insulation to further reduce heat loss from the U-shaped portions 566 of the coil 122 in addition to the heat loss reduction provided by installing an uninsulated shield 568.

Figure 5:
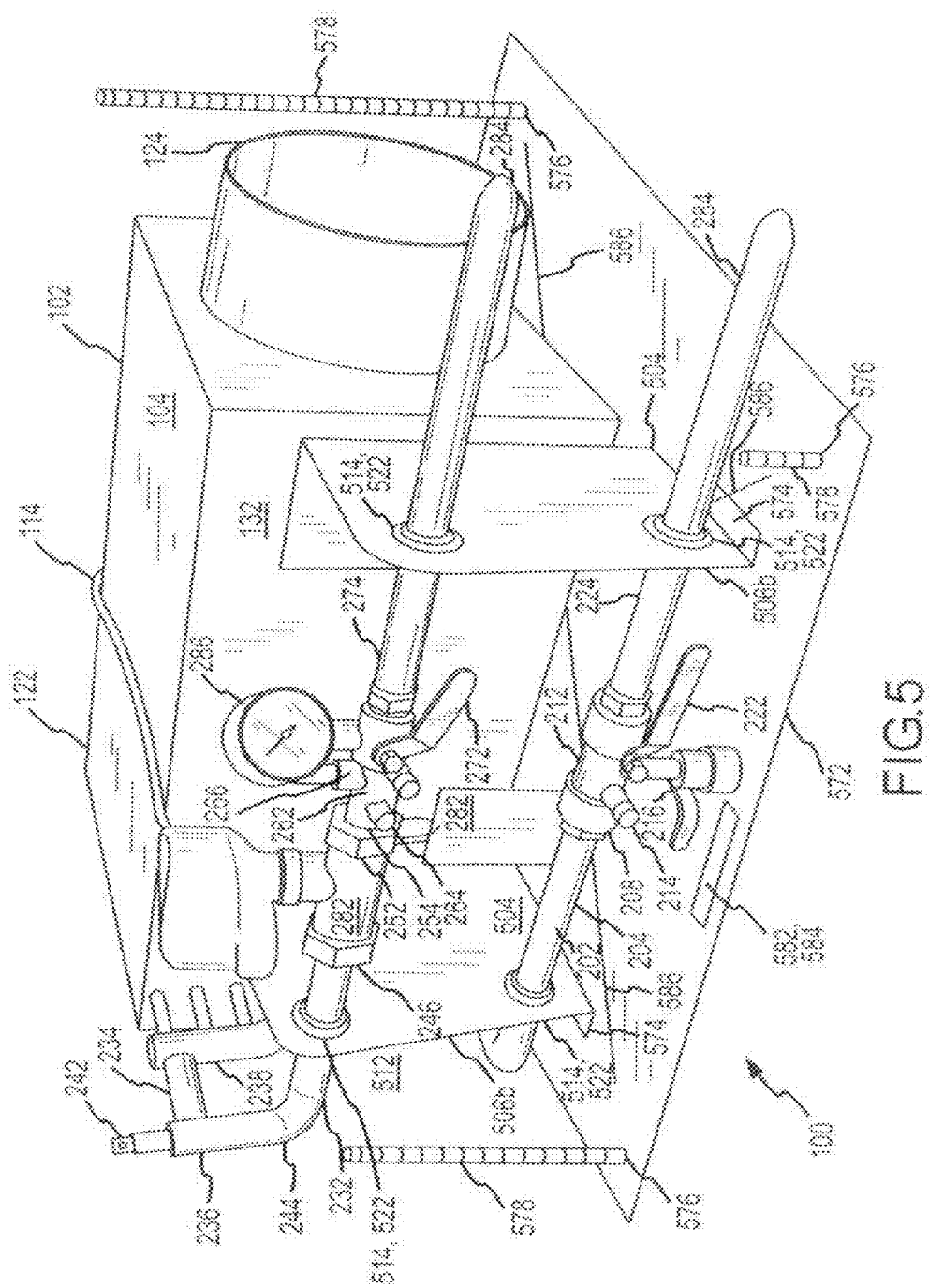
FIG. 5 is a perspective view of an alternative embodiment fully-functional zone-control unit similar to that depicted in FIG. 1, which includes a cradle located beneath the zone-control unit for supporting inlet and outlet piping assemblies included in the fully-functional zone-control unit, according to one embodiment of the present invention.

FIG. 5 is a perspective view of an alternative embodiment zone-control unit 100 in accordance with the present invention similar to the zone-control unit 100 depicted in FIG. 1. The zone-control unit 100 depicted in FIG. 4 includes a rectangularly-shaped cradle 572 disposed beneath and secured to the mechanical terminal unit 102. In the embodiment of the zone-control unit 100 depicted in FIG. 4, plates 506b, for mechanically securing the piping assemblies 202, 232 to the casing 104, omit the handles 502 established by the holes 512 formed in the plates 506a. Instead the plates 506b are narrower and L-shaped with a foot 574 which is secured to the cradle 572. The cradle 572 is pierced by holes 576 respectively located near each of its four corners, only three of which are visible in FIG. 4. In one embodiment, threaded rods 578 respectively pass through each of the holes 576 for supporting the cradle 572 from ceiling joists or an adjacent wall. Alternatively, an isolation spring (not illustrated in any of the figures) may be secured through each of the holes 576 and to an end of the threaded rod 578 nearest the hole 576. The cradle 572 is also pierced by a rectangularly-shaped hole 582 along an edge of the cradle 572 nearest to the piping assemblies 202, 232. The hole 582 provides the cradle 572 with a handle 584 for the zone-control unit 100 illustrated in FIG. 4 similar to the handles 502 provided by the holes 512 depicted in FIG. 1 that pierce the plates 506a.

Galvanized or stainless steel sheet material forming the cradle 572 includes linear, V-shaped troughs 586 formed therein in an X-shape which extend between diagonal pairs of holes 576. The troughs 586 cause the center of the cradle 572 where the troughs 586 intersect to be the lowest point thereof. Consequently, any water leaking from the piping assemblies 202, 232 collects at the middle of the cradle 572. The cradle 572 preferably includes a threaded fitting (not illustrated in any of the figures) that is located at the intersection of the troughs 586. The cradle 572 may have a flask (not illustrated in any of the figures) secured to the threaded fitting so any water which collects at the middle of the cradle 572 may flow through the fitting and be collected in the flask. Alternatively, a moisture sensor (not illustrated in any of the figures) may be secured to the threaded fitting for sending an electrical signal to a monitoring station if water collects at the middle of the cradle 572.

Arranged in this way, the handle mounting brackets 504, plates 506b and the cradle 572 provide a structure for mechanically coupling the mechanical terminal unit 102 and the piping assemblies 202, 232 together thereby reducing any possibility that the zone-control unit 100 might be damaged while being transported from its assembly, test and qualification location to a construction site. Furthermore, the handle 584 facilitates handling zone-control units 100 during their installation into the HVAC system such as maneuvering zone-control units 100 into position for installation into a building's ductwork. During installation, the handle mounting brackets 504, plates 506b and the cradle 572 maintain positional relationships between the mechanical terminal unit 102 including the coil 122 and the piping assemblies 202, 232 because the handle mounting brackets 504, plates 506b and the cradle 572 mechanically bind the entire zone-control unit 100 together into a single unit.

FIG. 6 illustrates an alternative embodiment of the zone-control unit 100 that further facilitates its installation into a building's ductwork. In this embodiment, a pair of sleeve mounting brackets 602, which replace the handle mounting brackets 504 depicted in FIG. 1, surround the casing 104 near opposite ends thereof. As better illustrated in FIG. 7, each sleeve mounting bracket 602 includes a substantially planar, generally rectangular frame 604 which extends outward from and surrounds the casing 104.

Stiffeners 606a through 606d, which may be formed integrally with the frame 604, project at right angles from interior edges 608 of the frame 604 to extend respectively along sides of the casing 104.

Because each sleeve mounting bracket 602 replaces one handle mounting bracket 504 illustrated in FIG. 1, for the embodiment depicted in FIG. 6 the handle 502 is secured to either one or the other of vertically oriented sides 612 of the frame 604. Thus, the sleeve mounting bracket 602 permits attaching handles 502 to either side of the frame 604 for supporting the piping assemblies 202, 232.

A pair of hanging plates 616 respectively extend at right angles from upper edges 614 of the vertically oriented sides 612 of the frame 604, and are preferably formed integrally with the sides 612. An aperture 622 pierces each of the hanging plates 616 thereby adapting it to receive one end of a threaded rod or of a seismic fastening product for suspending the zone-control unit 100 when installed in a HVAC system. The sleeve mounting bracket 602 also includes a pair of reinforcing plates 626 each of which spans between a depending edge 628 of the hanging plates 616 and an upper edge 629 respectively of the stiffeners 606b and 606d, and is welded thereto.

An elongated tab 632 projects upward as part of a horizontally oriented top side 634 of the frame 604. Fasteners 642, such as sheet metal screws, secure to the tab 632 a handle 644, which is shaped similar to or the same as the handle 502.

Similar to the handle 502, as best illustrated in FIG. 8 the handle 644 preferably includes a curved edge 646. For suspending zone-control units 100 within a building using the handle 644 secured to the tab 632 of the sleeve mounting bracket 602, an L-shaped upper mounting bracket 652 depicted in FIG. 7 is secured to a joist or other building structural member. A handle 654 identical to the handle 644 is secured to the upper mounting bracket 652 with fasteners 656 such as sheet metal screws. As illustrated in FIG. 8, a curved edge 658 of the handle 654 receives and mates with the curved edge 646 of the handle 644. Configured in this way, the mated handles 644, 654 provide a hanger for suspending the zone-control unit 100 which seismically isolates the zone-control unit 100 from the building. Seismic and vibration insulation between the building and the zone-control unit 100 can be enhanced by inserting between the curved edges 654, 658 a sheet of elastomeric material such as rubber (not illustrated in any of the figures). The handles 644, 654 can also be further secured to each other with fasteners such as screws. While the curved edges 654, 658 are preferred for coupling the handles 644, 654 together, other locking mechanisms can be used such as clips or/and screws, or metal on metal, etc. If the zone-control unit 100 needs to be located further from the joist or other structural member than that provided by the handles 644, 654, appropriate lengths of sheet metal may be interposed between the tab 632 and the handle 644 and/or between the upper mounting bracket 652 and the handle 654.

FIG. 9 illustrates yet another alternative embodiment of the zone-control unit 100 that further facilitates its installation into a building's ductwork. Analogously to the sleeve mounting bracket 602 of FIGS. 6-8, in the embodiment of FIG. 9 four (4) columnar mounting brackets 672 replace the handle mounting brackets 504 depicted in FIG. 1. Those elements depicted in FIG. 9 that are common to the sleeve mounting bracket 602 illustrated in FIGS. 6-8 carry the same reference numeral distinguished by a prime ("'") designation. Comparing FIG. 9 with FIGS. 6-8 reveals that each columnar mounting bracket 672 includes the side 612', the apertured hanging plate 616', the reinforcing plate 626 and either the stiffener 606b' or 606d' of the sleeve mounting bracket 602. Because each pair of columnar mounting brackets 672 lack the top side 634 of the sleeve mounting bracket 602 with its tab 632 and the handle 644 fastened thereto, when installed in a HVAC system the zone-control unit 100 illustrated in FIG. 9 must be hung from threaded rod or a seismic fastening product. The sleeve mounting brackets 602 and the columnar mounting brackets 672 may be formed from 14 gauge sheet steel.

Using 14 gauge sheet steel for the sleeve mounting brackets 602 and the columnar mounting brackets 672 may significantly increase the structural rigidity the lighter 22 gauge sheet steel generally used in fabricating the casing 104 of the mechanical terminal unit 102. Thus, either the sleeve mounting brackets 602 or the columnar mounting brackets 672 may be used advantageously in securing a zone-control unit 100 to a pallet for shipping to a building site. For example, either the sleeve mounting brackets 602 or the columnar mounting brackets 672 may be appropriately pierced by an aperture (not illustrated in any of the FIGS.) that receives strapping for securing the zone-control unit 100 to a pallet. Thus, both the sleeve mounting brackets 602 and the columnar mounting brackets 672 facilitate shipping zone-control units 100 to a building site without defects and/or damage.

Figure 10:
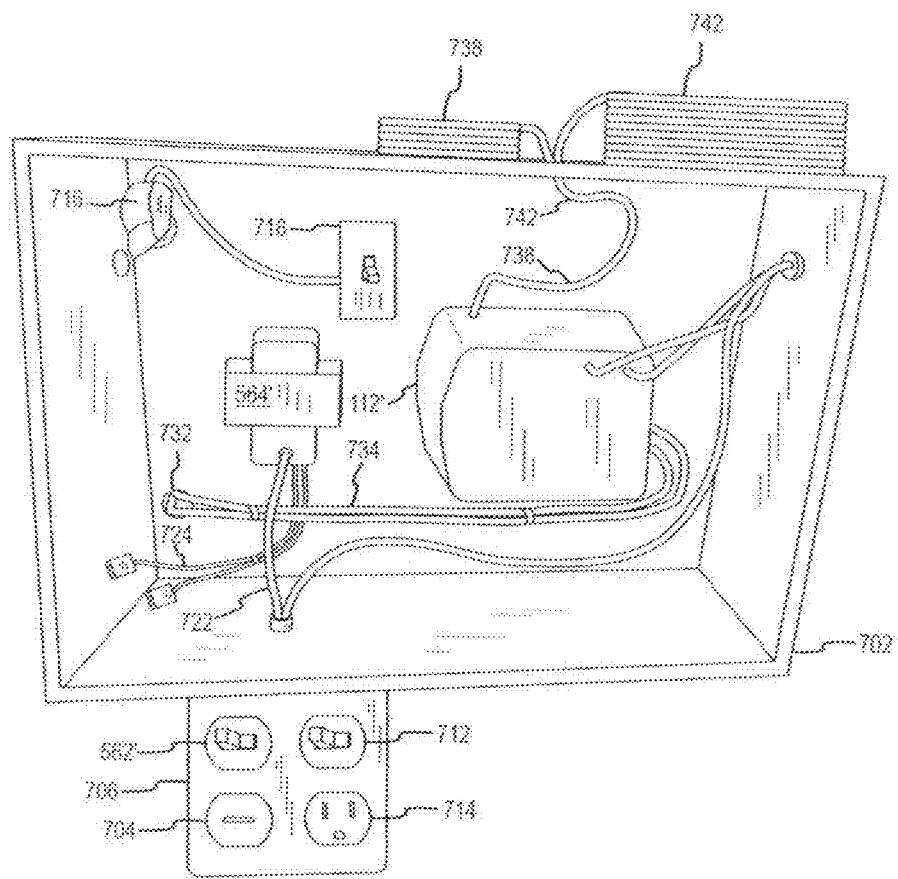
FIG. 10 is a perspective view of an electrical components enclosure for an fully-functional zone-control unit in accordance with the present disclosure adapted for use inside a building.

FIG. 10 depicts an electrical components enclosure 702, analogous to the NEMA enclosure 552 depicted in FIG. 3, which may be included in a zone-control unit 100 in accordance with the present disclosure that is suitable for installation only inside a building. Those elements depicted in FIG. 10 that are common to the zone-control unit 100 depicted in FIG. 1 and to the NEMA enclosure 552 illustrated in FIG. 3 carry the same reference numeral distinguished by a prime ("'") designation. With respect to the casing 104 included in the zone-control unit 100, the electrical components enclosure 702 may be secured to the top, to the bottom or to the side of the casing 104 opposite to that on which the piping assemblies 202, 232 and handles 502 are located.

Differing from the on-off switch 562 that is located inside the NEMA enclosure 552 depicted in FIG. 3, the on-off switch 562' illustrated in FIG. 10 and an associated LED power indicator 704 are both located in a separate utility box 706 attached outside the electrical components enclosure 702. However, similar to the NEMA enclosure 552 depicted in FIG. 3, both the DDC controller 112' and the transformer 564' are located within the electrical components enclosure 702 depicted in FIG. 10.

Including an individual transformer 564' in each zone-control unit 100 eliminates any need for an electrician to assemble multiple step down transformers on an electrical panel, or to install 24 volt low voltage wiring between a remotely located transformer and a terminal unit as described above. If the zone-control unit 100 is installed near a light and power conduit within the building, supplying the zone-control unit 100 with electrical power requires perhaps only a 1 to 5 foot connection of electrical wire and/or conduit. Buildings equipped with newer low energy (high efficiency) lighting, require less electrical power than that required by prior, less efficient lighting. DDC controllers, such as the DDC controller 112 and 112' respectively depicted in FIGS. 3 and 10, draw less than one-half (0.5) ampere of 115 volt alternating current ("AC") electrical power. Therefore, the zone-control unit 100 can be connected to a building's individual lighting circuits without a danger of electrical overload.

Differing from the NEMA enclosure 552 depicted in FIG. 3, the utility box 706 may include a second on-off switch 712 and power outlet 714 located in the utility box 706. The on-off switch 712 and the power outlet 714 provide a source of electrical power at the zone-control unit 100 to be used when servicing the zone-control unit 100. The embodiment of the electrical components enclosure 702 depicted in FIG. 10 also includes a service lamp 716 connected to an on-off switch 718. Analogous to the on-off switch 712 and the power outlet 714, the service lamp 716 facilitates servicing the zone-control unit 100.

For the electrical components enclosure 702 depicted in FIG. 10, electrical wires 722 connect the on-off switch 562' to the transformer 564' for energizing operation of the DDC controller 112' with 115 volt alternating current ("AC") electrical power. The electrical components enclosure 702 also preferably includes another set of electrical wires 724 connected to the transformer 564' which alternatively permit energizing operation of the zone-control unit 100 with 277 volt AC electrical power.

The electrical components enclosure 702 also preferably includes a pressure sensor inlet 732 for receiving air from the HVAC system's ducts connected to the zone-control unit 100. Within the electrical components enclosure 702, the pressure sensor inlet 732 supplies air from the ducts to the DDC controller 112' via tubes 734. The electrical components enclosure 702 also includes a length of electrical wire 738 connected to the DDC controller 112' which facilitates connecting the zone-control unit 100 to a temperature sensor located in the zone of the HVAC system supplied by the zone-control unit 100.

In general, DDC HVAC system controllers such as the DDC controller 112 and 112' respectively depicted in FIGS. 3 and 10 continually monitor and provide individual zones with a supply of fresh air. Presently, conventional DDC controllers include a communication capability that permits a central computer to monitor a building's HVAC system's operating status, and to coordinate operation of the various portions of the system including all of its terminal units. Presently, DDC controllers such as the 112 and 112' respectively depicted in FIGS. 3 and 10 are equipped with Local Area Network ("LAN") communications capability. To facilitate installing the zone-control unit 100, as illustrated in FIG. 10 the electrical components enclosure 702 is preferably equipped with a 100 ft. length of LAN cable 742 connected to the DDC controller 112'. Establishing the LAN that interconnects groups of zone-control units 100 all which include LAN cables 742 requires only that the LAN cable 742 of all but one of the zone-control units 100 in the group be connected to another one of the group's zone-control units 100.

Figure 11:
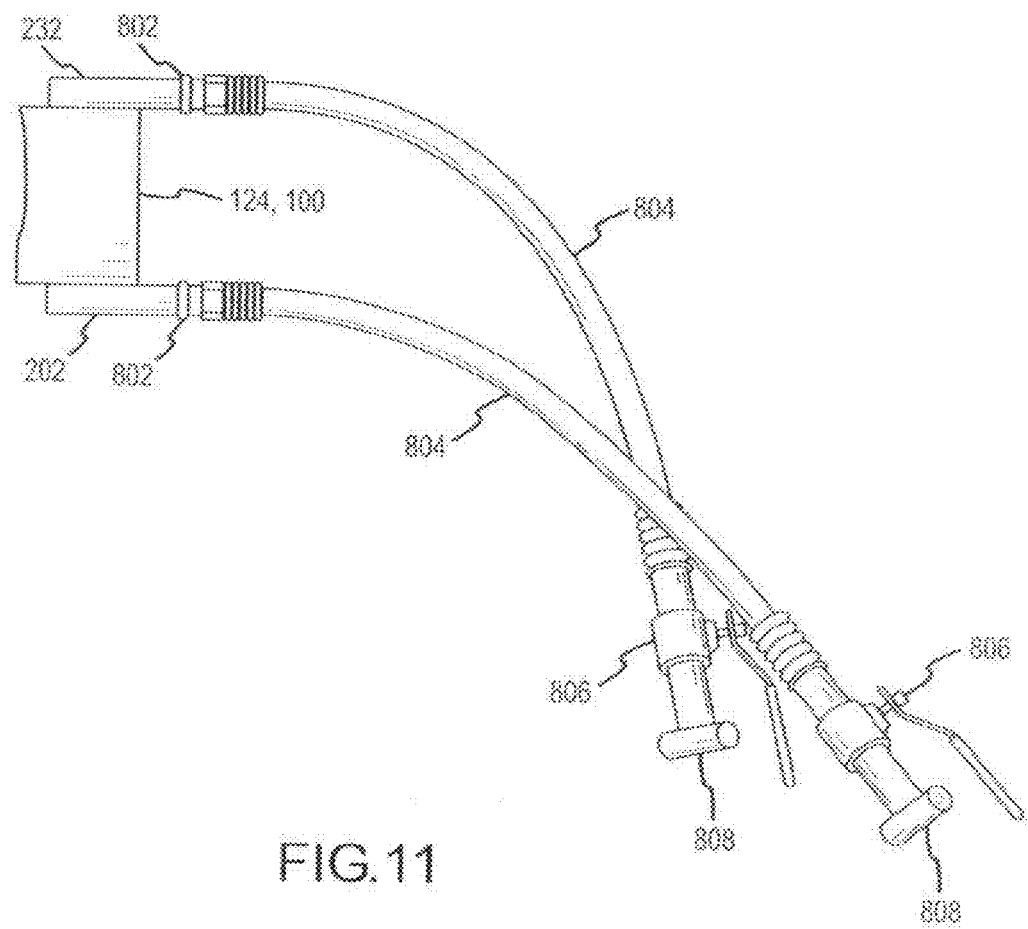
FIG. 11 is an elevational view of yet another alternative embodiment of a fully-functional zone-control unit in accordance with the present disclosure, in which appears a portion of the zone-control unit appearing in FIG. 1, that includes flexible braided hoses which facilitate connecting the zone-control unit's inlet and outlet piping assemblies to a building's plumbing.

To further facilitate installing zone-control units 100 into a building's HVAC system, FIG. 11 illustrates yet another alternative embodiment of the zone-control unit 100 which replaces the caps 284 on the piping assemblies 202, 232 with fittings 802 for connecting to flexible braided hoses 804 or other HVAC piping or hose components. Fittings 802 may be any type of fitting suitable for joining pipes, hoses, and the like. Fittings 802 may include press-fittings, push fittings, and various kinds of solder-less fittings. Another valve 806 connects to each end of the braided hoses 804 furthest from the piping assemblies 202, 232. Similar to the caps 284, closing both valves 806 connected to the end of each of the braided hoses 804 permits pressurizing both braided hoses 804, the piping assemblies 202, 232 and the coil 122 for leak testing, the 24 hour pre-shipment qualification pressure test, and assuring that the zone-control unit 100 remains leak free until installed into ductwork of a building's HVAC system.

A copper tee plumbing fitting 808 may connect to each valve 806 on the braided hoses 804 furthest from the piping assemblies 202, 232 on the side of the valves 806 furthest from the braided hoses 804. By including the tee plumbing fitting 808 in the zone-control unit 100, this particular embodiment permits a building's mechanical contractor, who is responsible for its plumbing, to make straight runs of copper pipe for the HVAC system's water which are located reasonably close to places where zone-control units 100 are to be installed, e.g. within 2 feet.

Then when installing zone-control units 100 into the building's ductwork, rather than being required to plumb the HVAC system's piping to the piping assemblies 202, 232, zone-control units 100 can be connected with the HVAC system's piping by cutting out a small length of the previously plumbed piping, and inserting the tee plumbing fitting 808 into the piping followed by sweating the connection of the tee plumbing fitting 808 to the HVAC system's piping.

Figure 12:
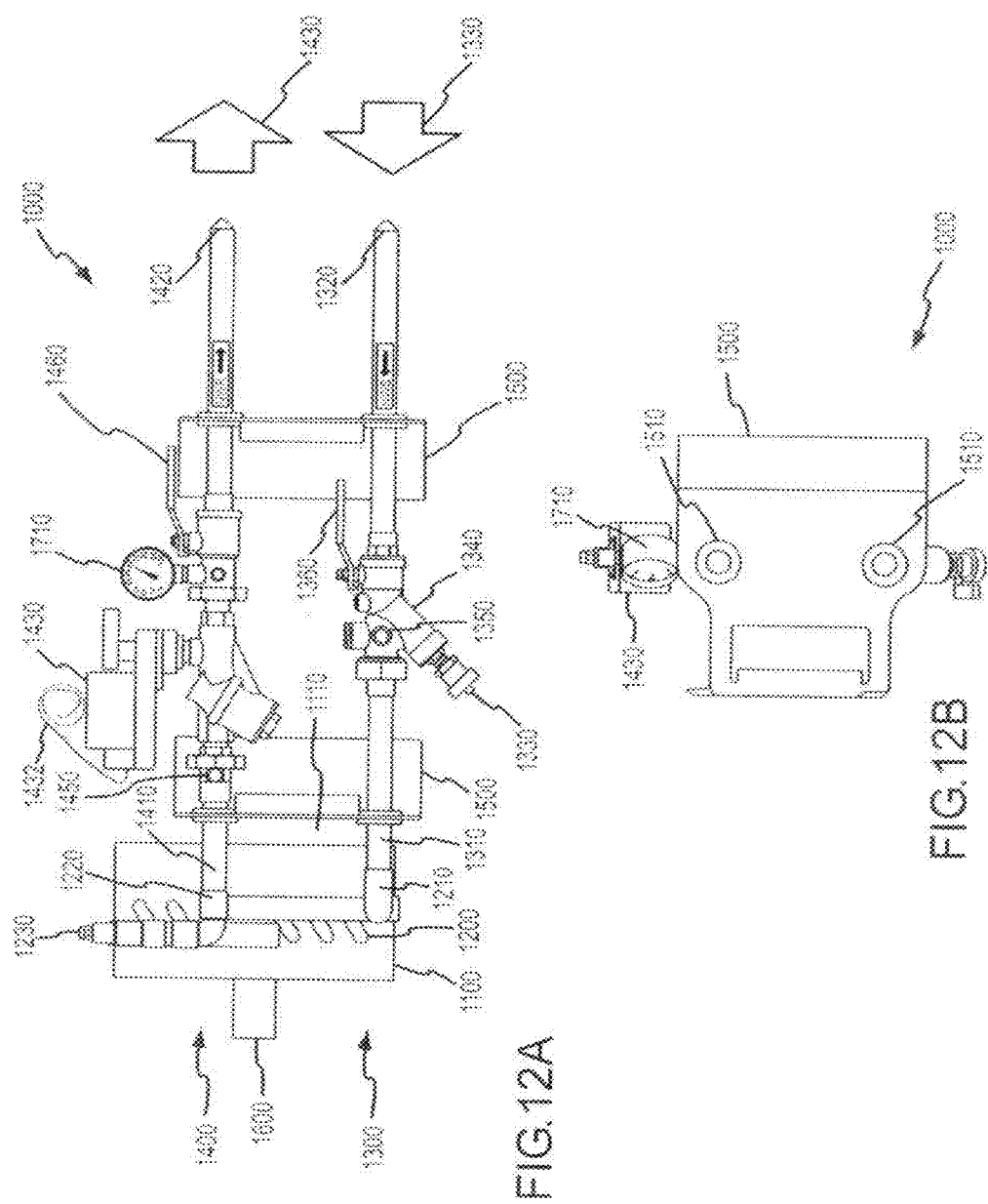
FIGS. 12A and B illustrate a zone-control unit according to one embodiment of the present invention.

FIG. 12A illustrates a side view of a zone-control unit 1000 for use in an HVAC system, according to one embodiment of the present invention, and FIG. 12B illustrates the corresponding end view. Zone-control unit 1000 includes a duct or casing 1100, a thermal transfer unit 1200, an inlet piping assembly 1300, an outlet piping assembly 1400, and at least one bracket 1500. In some embodiments, bracket 1500 can be a powder-coated handle shipping bracket. Bracket 1500 may include any of a variety of suitable materials, including metals, composites, and the like. Inclusion of bracket 1500 can allow zone-control unit 1000 to be pre-engineered, sealed, pressure-tested, and shipped to job-site in working condition, free of defects. Zone-control unit 1000 may include military rubber Nitrile grommets 1510 for isolation between bracket 1500 and piping assemblies 1300 and 1400. Grommets 1510 can help secure and protect zone-control unit 1000, and can help reduce or eliminate the possibility of galvanic corrosion at the interface between bracket 1500 and piping assemblies 1300 and 1400. Grommets 1510 can be manufactured to withstand heat, and in some cases can withstand a direct flame of 220 degrees F., or higher. Bracket 1500 may include openings that are designed to fit the fork of a forklift, a steel pole, or a human hand. In some embodiments, bracket 1500 may not include an opening. Bracket 1500 is well suited for reducing or preventing field damage. For example, with known systems and methods, field personnel typically lift or move HVAC components simply by grasping various piping or probe elements, which often results in destruction or serious damage to the component. Bracket 1500 confers the ability to ship and maneuver zone-control unit 1000 in a standardized and safe manner. Often, thermal transfer unit 1200, which may include a coil, is at least partially disposed within casing 1100. Inlet piping assembly 1300 is coupled with thermal transfer unit 1200 for supplying liquid or gas to coil 1200, and outlet piping assembly 1400 is coupled with coil 1200 for receiving liquid or gas from coil 1200. This can be accomplished by coupling a first passage 1310 of inlet piping assembly 1300 with a supply port 1210 of thermal transfer unit 1200, and coupling a first passage 1410 of the outlet piping assembly 1400 with a return port 1220 of thermal transfer unit 1200. A second passage 1320 of inlet piping assembly 1300 can be coupled with an upstream fluid source 1330, and a second passage 1420 of outlet piping assembly 1400 can be coupled with a downstream fluid destination 1430. In some embodiments, a portable piping structure may include a heat exchanger coupled with a bracket and a pipe. The bracket is often also coupled with the pipe.

It is appreciated that inlet piping assembly second passage 1320 and outlet piping assembly second passage 1420 each can be sealed, inlet piping assembly first passage 1310 can be in sealed communication with thermal transfer assembly supply port 1210, and outlet piping assembly first passage 1410 can be in sealed communication with the thermal transfer assembly return port 1220. When sealed in this fashion, thermal transfer unit 1200 can contain a vacuum, a non-pressurized fluid, or a pressurized fluid. Inlet piping assembly second passage 1320 and outlet piping assembly second passage 1420 can be manufactured from, for example, ¾ inch type L copper water pipe. They can be sealed according to a heating and spinning procedure that introduces no annealing or distortion of the pipe. After zone-control unit 1000 is placed in the desired location relative to the HVAC system, distal tips of inlet piping assembly second passage 1320 and outlet piping assembly second passage 1420 can be cut, and connected with other HVAC piping or hose elements, such as a hot water piping building loop. Relatedly, zone-control unit 1000 includes a pressure gauge 1710 coupled with inlet piping assembly 1400. In some embodiments, pressure gauge 1710 may be coupled with thermal transfer unit 1200 or outlet piping assembly 1300. Inlet piping assembly 1300 may be coupled with a drain valve 1330, a Y-strainer 1340, a pressure/temperature port 1350, or a supply shutoff valve 1360, or any combination thereof. Outlet piping assembly 1400 may be coupled with control valve 1430, a balancing valve (not shown), a vent (not shown), a pressure/temperature port 1450, or a return shutoff valve 1460, or any combination thereof. Control valve 1430 may be an automatic temperature control (ATC) valve having a compensated ball valve including an integral pressure limiting and flow setting apparatus. Valve 1430 can assure consistent flow response regardless of the head pressure. In some cases, there is no CV setting on the valve. Relatedly, zone-control unit 1000 may include a field set manual or factory programmable maximum flow setting. In some embodiments, valve balancing may be accomplished in less than 30 seconds. Valve 1430 may have a shutoff pressure of 200 psi. Conveniently, valve 1430 may have a pressure sufficient to counteract a heating loop dead head pressure, which can be 50 psi or more. In related embodiments, valve 1430 can be a ½ inch, a ¾ inch, or 1 inch valve. Control valve 1430 may be a modulating Siemens ATC.

In some embodiments, a mechanical pressure/temperature port may be replaced, supplemented, or operatively coupled with one or more analog or digital electronic sensors, including sensors enabled for wireless communication, that detect or sense flow volume, for example in gallons per minute (gpm), or other flow variables such as pressure, temperature, and the like. Advantageously, the incorporation of such electronic sensors can eliminate the need for a technician to manually access a heat exchanger to perform troubleshooting or diagnostic procedures with gauges. These electronic sensors can replace such gauges, and can be pre-calibrated or pre-programmed at a manufacturer factory prior to installation. Accordingly, many of all flow variables can be monitored remotely through a building automation control system. A technician can check these variables remotely or wirelessly with a personal digital assistant (PDA), a laptop, or other suitable device. These sensors may also be operatively coupled with a damper assembly controller, a direct digital controller, an analog electronic controller, or other desired component of a zone-control unit.

Thermal transfer unit 1200 may be coupled with a vent 1230 such as an air vent. In some instances, vent 1230 is a manual air vent disposed at or toward the highest point of thermal transfer unit 1200. Vent 1230 can help ensure proper drainage of air or other unwanted fluids or gasses that enter the system, which can have deleterious effects on an HVAC system. For example, unwanted air in a hot water system can cause cavitation in a hot water pump, which may cause malfunction or destruction of the pump or other system components. Vents can also help ensure optimum flow characteristics when draining thermal transfer unit 1200 or other zone-control unit 1000 components. Full drainage of such components can facilitate the removal of unwanted particles such as rust or other chemical buildup. In some embodiments, vent 1230 is constructed of a non-corrosive military grade brass. In the embodiment shown here, zone-control unit 1000 includes a duct interface 1110 which is coupleable with duct or casing 1100, which may be attached with or integral to a duct or ductwork of an HVAC system. Bracket 1500, which may include a handle, supports duct interface 1100, inlet piping assembly 1300, and outlet piping assembly 1400 with relative positions appropriate for use in an HVAC system or other climate control system. In some cases, bracket 1500 may be a handle configured to maintain duct or casing 1100, inlet piping assembly 1300, and outlet piping assembly 1400 in positional relationship.

As shown in FIG. 12A, zone-control unit 1000 can include a damper assembly controller 1600, which may be coupled with casing 1100. Damper assembly controller 1600 may be configured to receive a signal from a thermostat or a room sensor (not shown). In some embodiments, damper assembly controller 1600 can include, for example, an analog electronic controller, or a direct digital control (DDC) controller equipped with Local Area Network (LAN) communication capability. In some cases, controller 1600 can be a pneumatic DDC. Controller 1600 can also be configured to operatively associate with or have connectivity with a LonWorks or BACnet system. Unit 1000 can also include an automatic temperature control (ATC) valve 1430, which is typically coupled with or part of outlet piping assembly 1400, and configured to receive a signal from damper assembly controller 1600, for example, by connection with plenum rated actuator wires 1432. Other embodiments may employ wireless signal transmission technologies. In certain embodiments, ATC valve 1430 is a Nema 1 24V Belimo proportional actuator. Accordingly, in some embodiments the present invention provides a proportional hot water valve package (PICCV). Often, zone-control unit 1000 will be configured to have one piping interface, one electrical interface, and one sheet metal interface, so as to provide a "plug and play" unit for ease of shipping and installation.

Figure 13:
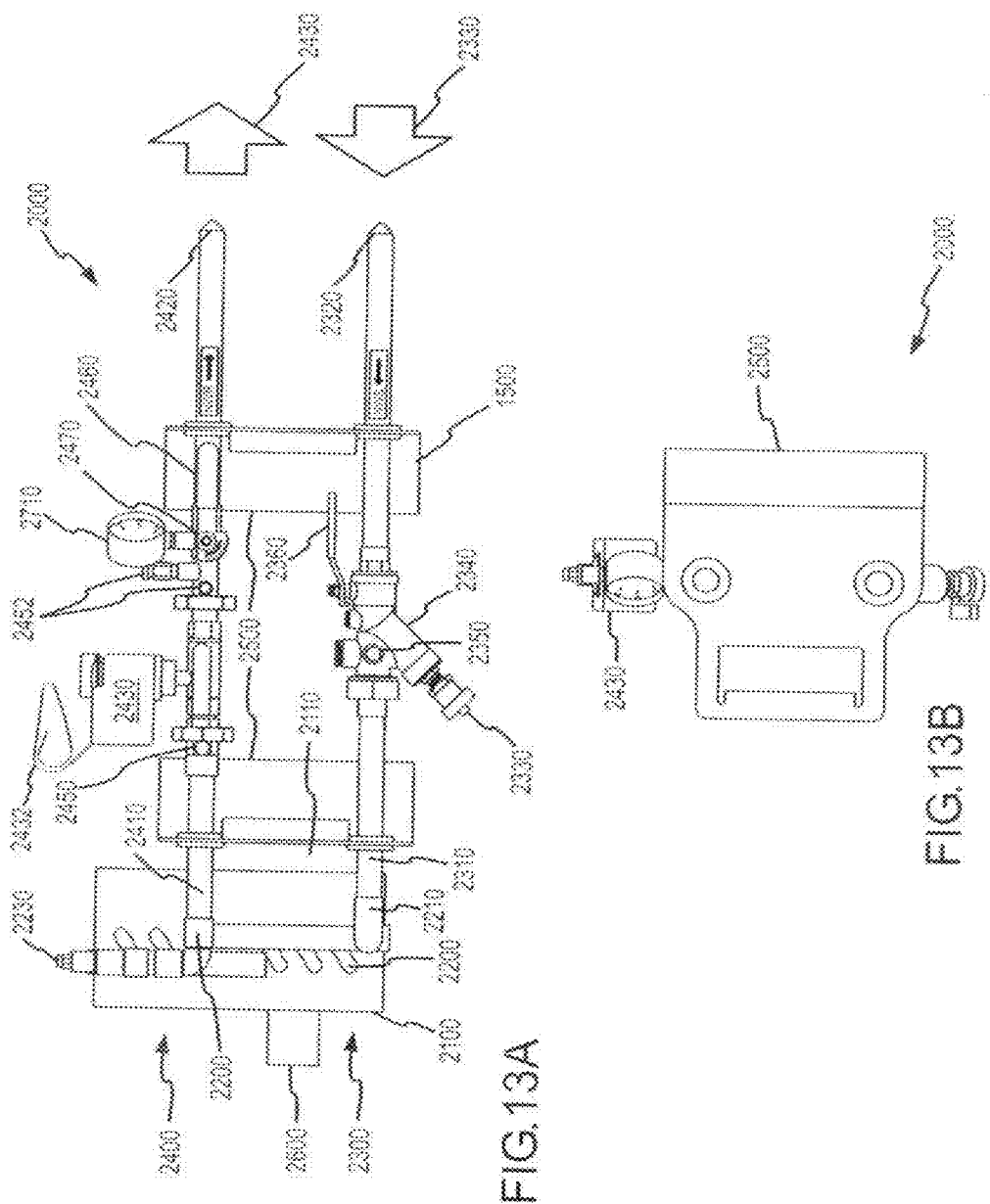
FIGS. 13A and B illustrate a zone-control unit according to one embodiment of the present invention.

FIG. 13A illustrates a side view of a zone-control unit 2000 for use in an HVAC system, according to one embodiment of the present invention, and FIG. 13B illustrates the corresponding end view. Zone-control unit 2000 includes a duct or casing 2100, a thermal transfer unit 2200, an inlet piping assembly 2300, an outlet piping assembly 2400, and at least one bracket 2500. Often, thermal transfer unit 2200, which may include a coil, is at least partially disposed within casing 2100. Inlet piping assembly 2300 is coupled with thermal transfer unit 2200 for supplying liquid or gas to coil 2200, and outlet piping assembly 2400 is coupled with coil 2200 for receiving liquid or gas from coil 2200. This can be accomplished by coupling a first passage 2310 of inlet piping assembly 2300 with a supply port 2210 of thermal transfer unit 2200, and coupling a first passage 2410 of the outlet piping assembly 2400 with a return port 2220 of thermal transfer unit 2200. A second passage 2320 of inlet piping assembly 2300 can be coupled with an upstream fluid source 2330, and a second passage 2420 of outlet piping assembly 2400 can be coupled with a downstream fluid destination 2430.

It is appreciated that inlet piping assembly second passage 2320 and outlet piping assembly second passage 2420 each can be sealed, inlet piping assembly first passage 2310 can be in sealed communication with thermal transfer assembly supply port 2210, and outlet piping assembly first passage 2410 can be in sealed communication with the thermal transfer assembly return port 2220. When sealed in this fashion, thermal transfer unit 2200 can contain a vacuum, a non-pressurized fluid, or a pressurized fluid. Relatedly, zone-control unit 2000 includes a pressure gauge 2710 coupled with inlet piping assembly 2400. In some embodiments, pressure gauge 2710 may be coupled with thermal transfer unit 2200 or inlet piping assembly 2300. Inlet piping assembly 2300 may be coupled with a drain valve 2330, a Y-strainer 2340, a pressure/temperature port 2350, or a supply shutoff valve 2360, or any combination thereof. Outlet piping assembly 2400 may be coupled with control valve 2430, a manual balancing valve 2470, a vent (not shown), a pressure/temperature port 2450 disposed upstream of control valve 2430, a pressure/temperature port 2452 disposed downstream of control valve 2430, or a return shutoff valve 2460, or any combination thereof. In some cases, balancing valve 2470 may be a Griswold pressure independent balancing valve. Thermal transfer unit 2200 may be coupled with a vent 2230 such as an air vent. In the embodiment shown here, zone-control unit 2000 includes a duct interface 2110 which is coupleable with duct or casing 2100, which may be attached with or integral to a duct or ductwork of an HVAC system. Bracket 2500, which may include a handle, supports duct interface 2110, inlet piping assembly 2300, and outlet piping assembly 2400 with relative positions appropriate for use in an HVAC system or other climate control system. In some cases, bracket 2500 may be a handle configured to maintain duct or casing 2100, inlet piping assembly 2300, and outlet piping assembly 2400 in positional relationship.

As shown in FIG. 13A, zone-control unit 2000 can include a damper assembly controller 2600, which may be coupled with casing 2100. Damper assembly controller 1600 may be configured to receive a signal from a thermostat or a room sensor (not shown). In some embodiments, damper assembly controller 2600 includes a direct digital control (DDC) controller equipped with Local Area Network (LAN) communication capability. Unit 2000 can also include an automatic temperature control (ATC) valve 2430, which is typically coupled with or part of outlet piping assembly 2400, and configured to receive a signal from damper assembly controller 2600, in some embodiments by connection with plenum rated actuator wires 2432, via wireless signal transmission systems, or the like. In certain embodiments, ATC valve 2430 is a Nema 1 24V Belimo on/off actuator. Accordingly, in some embodiments the present invention provides a two way water valve package (CCV).

Figure 14:
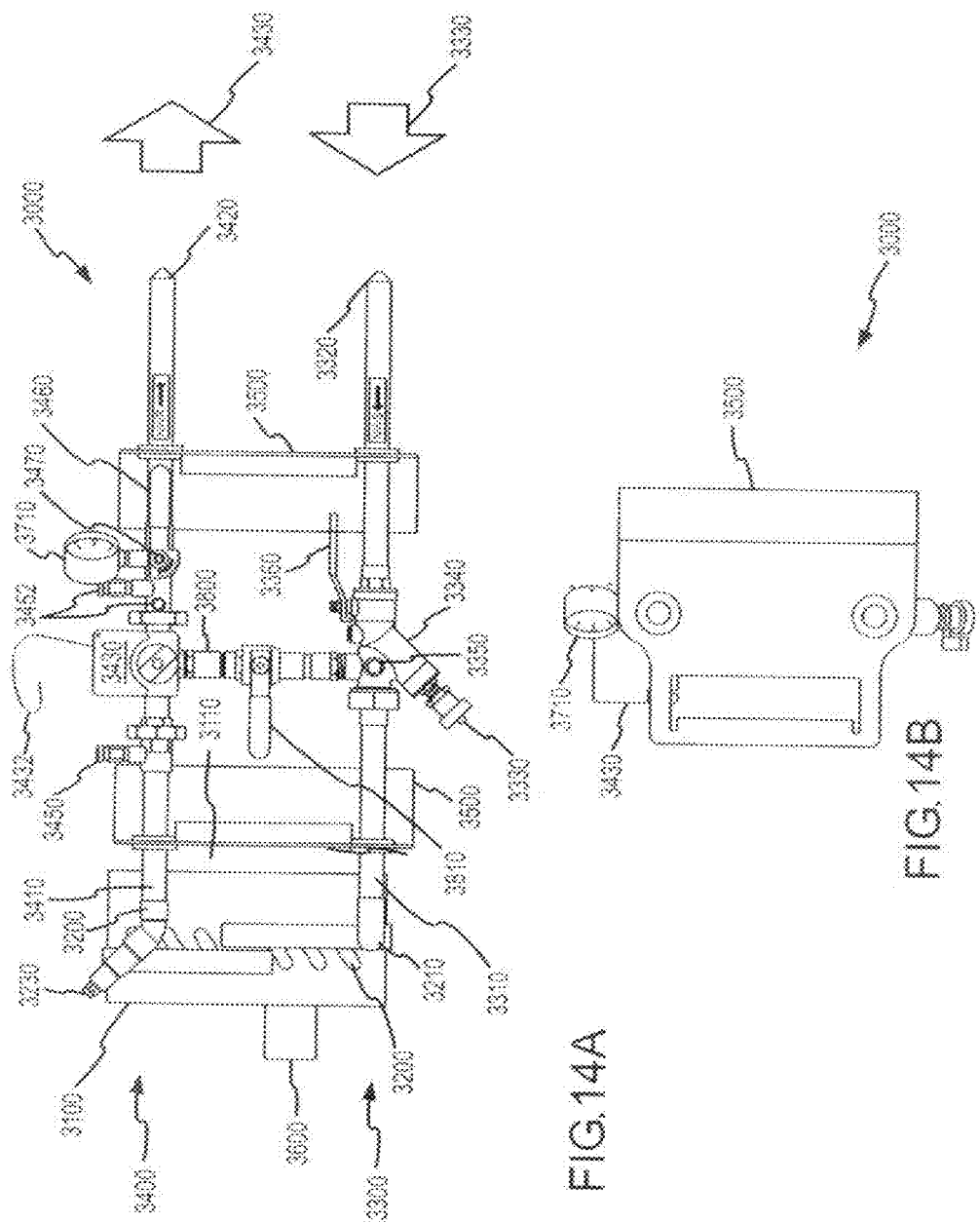
FIGS. 14A and B illustrate a zone-control unit according to one embodiment of the present invention.

FIG. 14A illustrates a side view of a zone-control unit 3000 for use in an HVAC system, according to one embodiment of the present invention, and FIG. 14B illustrates the corresponding end view. Zone-control unit 3000 includes a duct or casing 3100, a thermal transfer unit 3200, an inlet piping assembly 3300, an outlet piping assembly 3400, a bypass piping assembly 3800, and at least one bracket 3500. Often, thermal transfer unit 3200, which may include a coil, is at least partially disposed within casing 3100. Inlet piping assembly 3300 is coupled with thermal transfer unit 3200 for supplying liquid or gas to coil 3200, and outlet piping assembly 3400 is coupled with coil 3200 for receiving liquid or gas from coil 3200. This can be accomplished by coupling a first passage 3310 of inlet piping assembly 3300 with a supply port 3210 of thermal transfer unit 3200, and coupling a first passage 3410 of the outlet piping assembly 3400 with a return port 3220 of thermal transfer unit 3200. A second passage 3320 of inlet piping assembly 3300 can be coupled with an upstream fluid source 3330, and a second passage 3420 of outlet piping assembly 3400 can be coupled with a downstream fluid destination 3430.

It is appreciated that inlet piping assembly second passage 3320 and outlet piping assembly second passage 3420 each can be sealed, inlet piping assembly first passage 3310 can be in sealed communication with thermal transfer assembly supply port 3210, and outlet piping assembly first passage 3410 can be in sealed communication with the thermal transfer assembly return port 3220. Similarly, bypass piping assembly 3800 can be in sealed communication with inlet piping assembly 3300 and outlet piping assembly 3400 so as to provide a fluid passage therebetween, whereby the passage can be open and closed via operation of bypass shutoff valve 3810. When sealed in this fashion, thermal transfer unit 3200 can contain a vacuum, a non-pressurized fluid, or a pressurized fluid. Relatedly, zone-control unit 3000 includes a pressure gauge 3710 coupled with outlet piping assembly 3400. In some embodiments, pressure gauge 3710 may be coupled with thermal transfer unit 3200 or inlet piping assembly 3300. When bypass shutoff valve 3810 is in the open position, fluid can flow directly from inlet piping assembly 3300 to outlet piping assembly 3400 without flowing through thermal transfer unit 3200. When bypass shutoff valve 3810 is in the closed position, fluid can flow from inlet piping assembly 3300 to outlet piping assembly 3400 through thermal transfer unit 3200, without flowing through bypass piping assembly 3800. Inlet piping assembly 3300 may be coupled with a drain valve 3330, a Y-strainer 3340, a pressure/temperature port 3350, or a supply shutoff valve 3360, or any combination thereof. Outlet piping assembly 3400 may be coupled with control valve 3430, a manual balancing valve 3470, a vent (not shown), a pressure/temperature port 3450 disposed upstream of control valve 3430, a pressure/temperature port 3452 disposed downstream of control valve 3430, or a return shutoff valve 3460, or any combination thereof. Thermal transfer unit 3200 may be coupled with a vent 3230 such as an air vent. In the embodiment shown here, zone-control unit 3000 includes a duct interface 3110 which is coupleable with duct or casing 3100, which may be attached with or integral to a duct or ductwork of an HVAC system. Bracket 3500, which may include a handle, supports duct interface 3110, inlet piping assembly 3300, and outlet piping assembly 3400 with relative positions appropriate for use in an HVAC system or other climate control system. In some cases, bracket 3500 may be a handle configured to maintain duct or casing 3100, inlet piping assembly 3300, and outlet piping assembly 3400 in positional relationship.

As shown in FIG. 14A, zone-control unit 3000 can include a damper assembly controller 3600, which may be coupled with casing 3100. Damper assembly controller 3600 may be configured to receive a signal from a thermostat or a room sensor (not shown). In some embodiments, damper assembly controller 3600 includes a direct digital control (DDC) controller equipped with Local Area Network (LAN) communication capability. Unit 3000 can also include an automatic temperature control (ATC) valve 3430, which is typically coupled with or part of outlet piping assembly 3400, and configured to receive a signal from damper assembly controller 3600 by connection with plenum rated actuator wires 3432, wireless transmission systems, or the like. In certain embodiments, ATC valve 3430 is a Nema 1 24V Belimo three way actuator. Accordingly, in some embodiments the present invention provides a three way water valve package (CCV).

Figure 15:
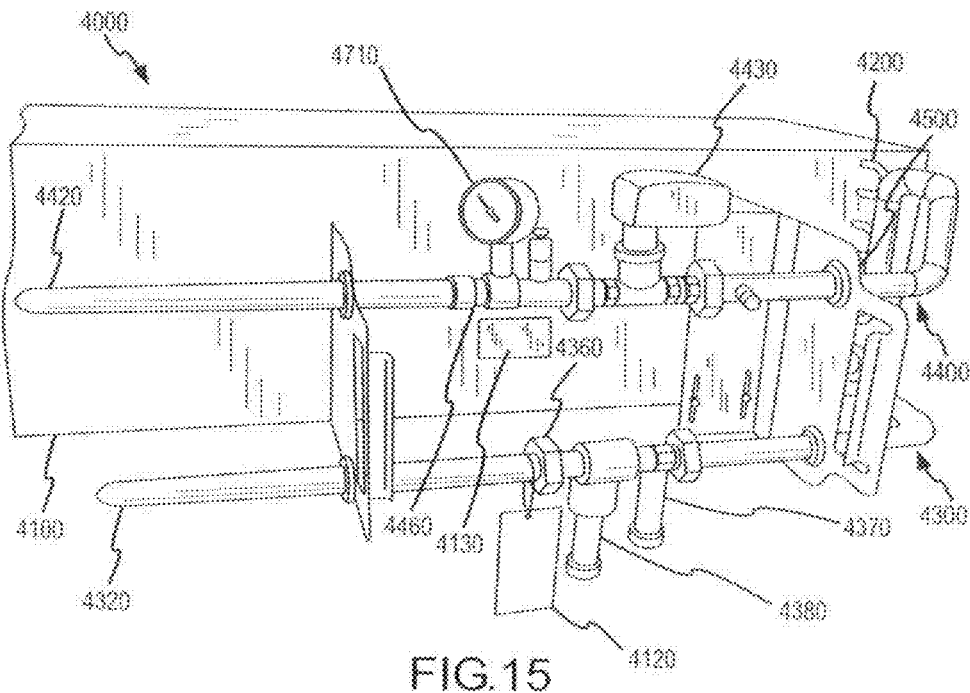
FIG. 15 illustrates a zone-control unit according to one embodiment of the present invention.

FIG. 15 illustrates a side view of a zone-control unit 4000 for use in an HVAC system, according to one embodiment of the present invention. Zone-control unit 4000 includes a duct or casing 4100, a thermal transfer unit 4200, an inlet piping assembly 4300, an outlet piping assembly 4400, and at least one bracket 4500. Often, thermal transfer unit 4200, which may include a coil, is at least partially disposed within casing 4100. Inlet piping assembly 4300 is coupled with thermal transfer unit 4200 for supplying liquid or gas to coil 4200, and outlet piping assembly 4400 is coupled with coil 4200 for receiving liquid or gas from coil 4200. Zone-control unit 4000 includes a pressure gauge 4710 coupled with outlet piping assembly 4400. In some embodiments, pressure gauge 4710 may be coupled with thermal transfer unit 4200 or inlet piping assembly 4300. Inlet piping assembly 4300 may be coupled with a basket strainer 4380. Zone-control unit 4000 can be cleaned by fluid or water pressure without removing basket strainer 4380. Inlet piping assembly may also be coupled with a blow down drain 4370 for basket strainer 4380. Outlet piping assembly 4400 may be coupled with a control valve 4430. In the embodiment shown here, zone-control unit 4000 includes a casing 4100 which may be attached with a duct or ductwork of an HVAC system. Bracket 4500, which may include a handle, supports casing 4100, inlet piping assembly 4300, and outlet piping assembly 4400 with relative positions appropriate for use in an HVAC system or other climate control system. Zone-control unit 4000 may also include a custom digital imaging tag 4130 or custom PC router tag or validation package 4120 containing information regarding the configuration or manufacture of the unit. Information may be provided in electronic or paper format, and may include submittal information, O&M's of unit components, digital pictures of the product or components, QC sheets, wiring and piping diagrams, parts lists with model numbers and serial numbers, and the like.

Figure 16:
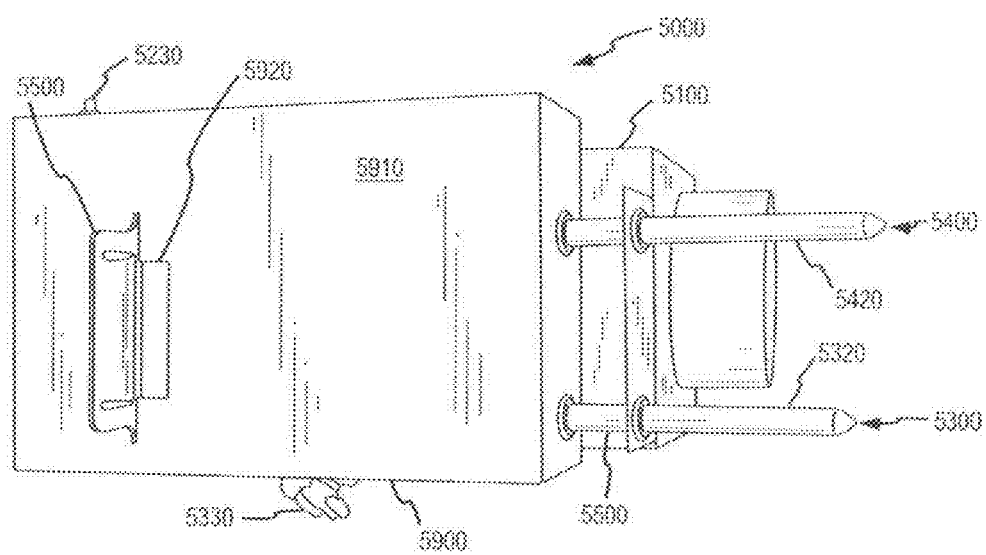
FIG. 16 illustrates a zone-control unit according to one embodiment of the present invention.

FIG. 16 illustrates a side view of a zone-control unit 5000 for use in an HVAC system, according to one embodiment of the present invention. Zone-control unit 5000 includes a duct or casing 5100, a thermal transfer unit (not shown), an inlet piping assembly 5300, an outlet piping assembly 5400, and at least one bracket 5500. Zone-control unit 5000 also includes a housing 5900 coupled with casing 5100, such that housing 5900 encompasses ATC valve (not shown) and other components of zone-control unit 5000 as described elsewhere herein. For comparative reference with other figures of the present disclosure, zone-control unit 5000 is depicted here showing a vent 5230, a drain valve 5330, an inlet piping assembly second passage 5320 and an outlet piping assembly second passage 5420. A housing cover 5910 of housing 5900 may have an aperture 5920 through which bracket 5500 may extend, or through which bracket 5500 may be otherwise accessible via an operator's hands, a forklift, or other maneuvering apparatus used during transportation, shipping, or installation. Zone-control unit 5000 may also have a validation package 4120, which may include a digital picture of the zone-control unit 5000 or components thereof, a quality control sheet, an operations and maintenance document, a parts list with model and serial numbers, an Indoor Air Quality (IAQ) certification, or a piping, electrical, and controls schematic, or any combination thereof. These components of validation package 4120 may be stored in a plastic pouch and attached with unit 6000. It is appreciated therefore that the present invention can be conveniently tested, validated, standardized, cataloged, and certified prior to shipping or installation.

Figure 17:
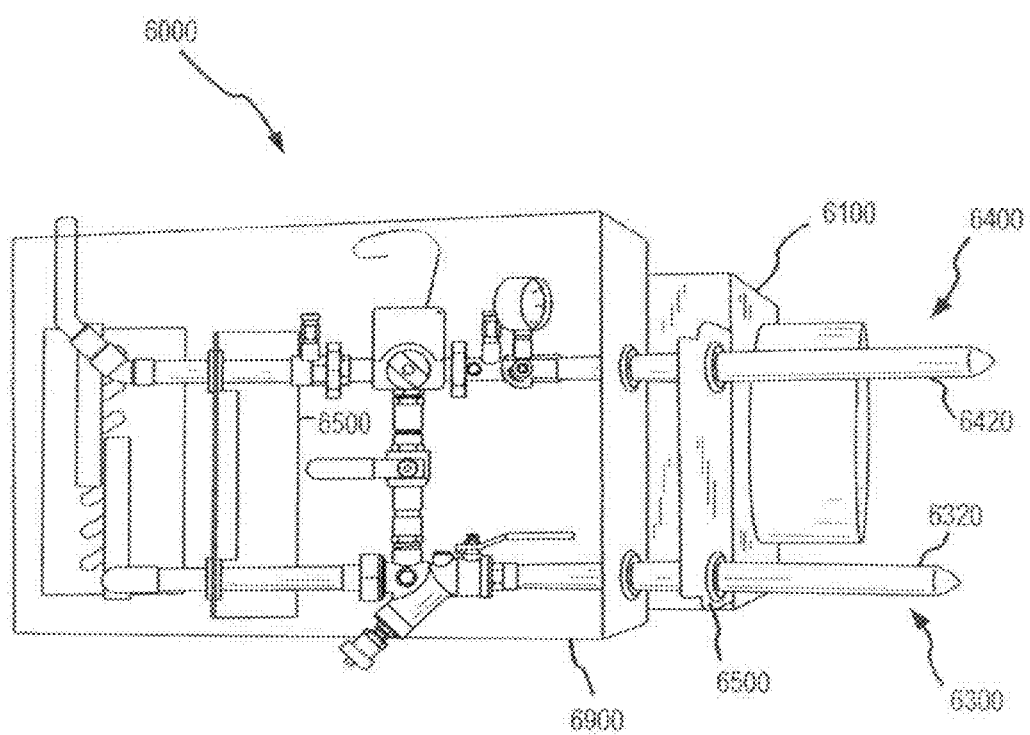
FIG. 17 illustrates a zone-control unit according to one embodiment of the present invention.
Figure 18A:
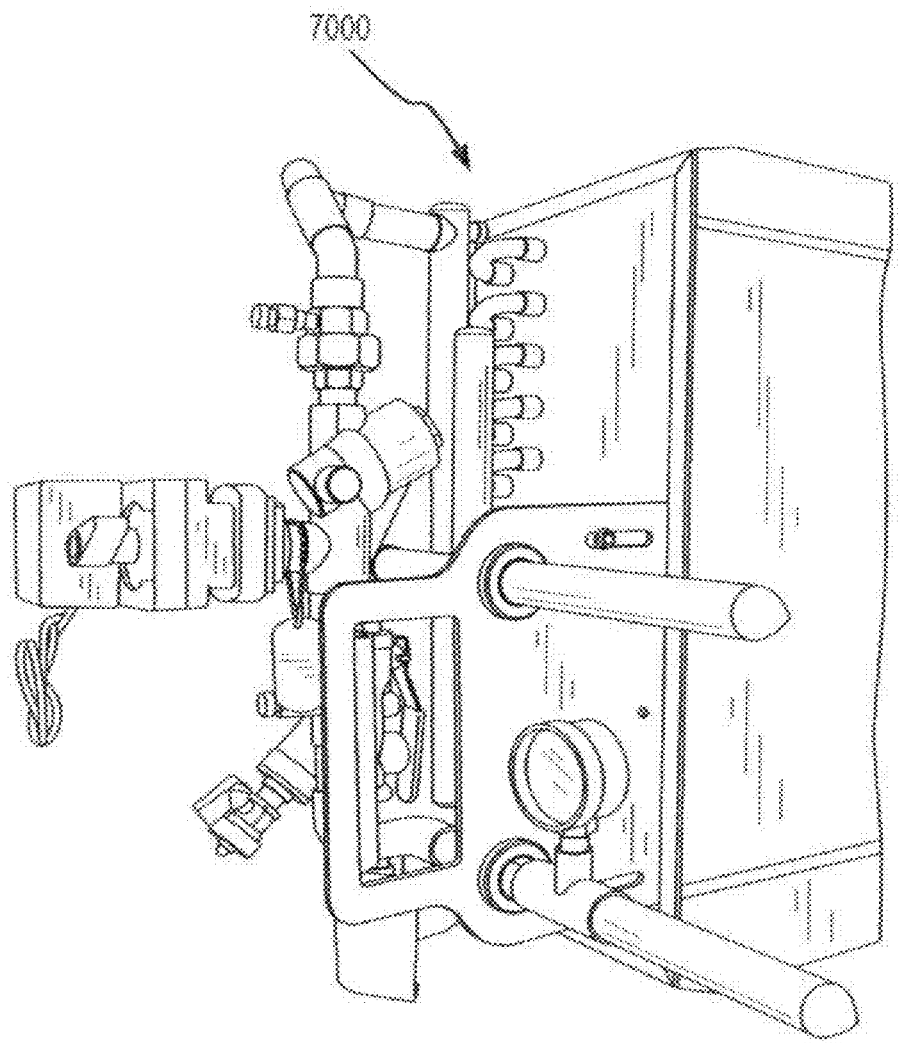
FIGS. 18A-18E illustrate a heat exchanger/coil packaged with ancillary components.
Figure 18B:
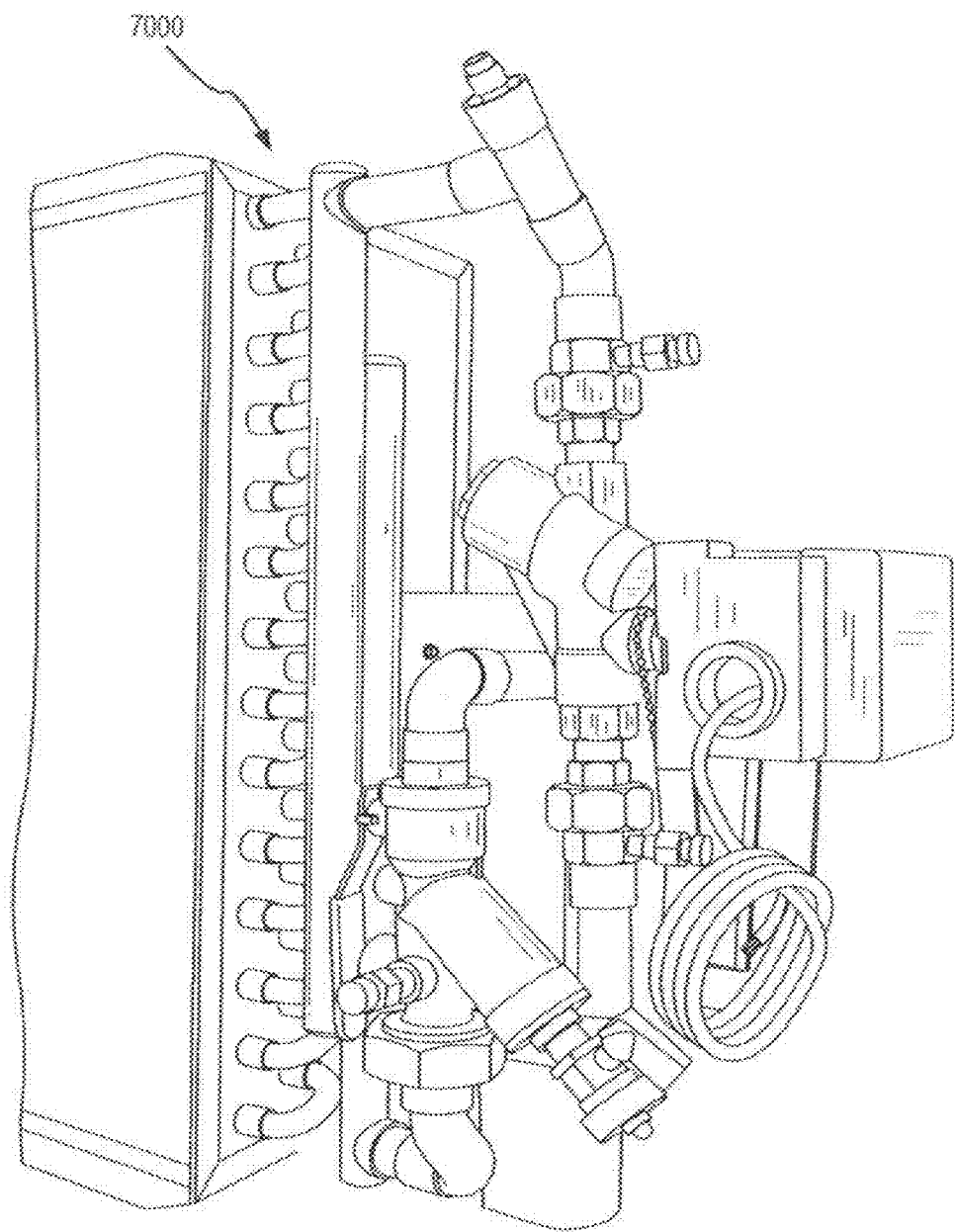
Figure 18C:
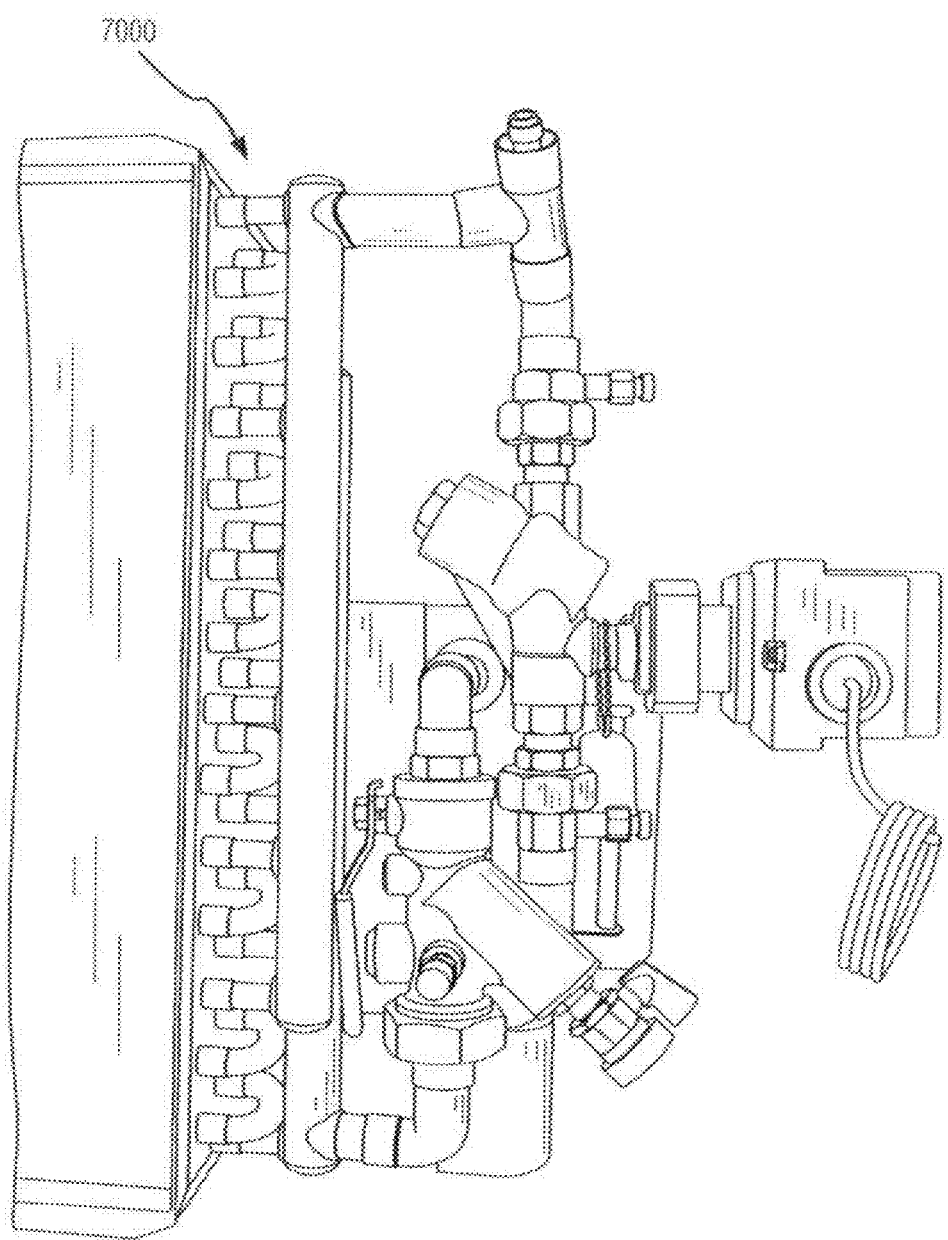
Figure 18D:
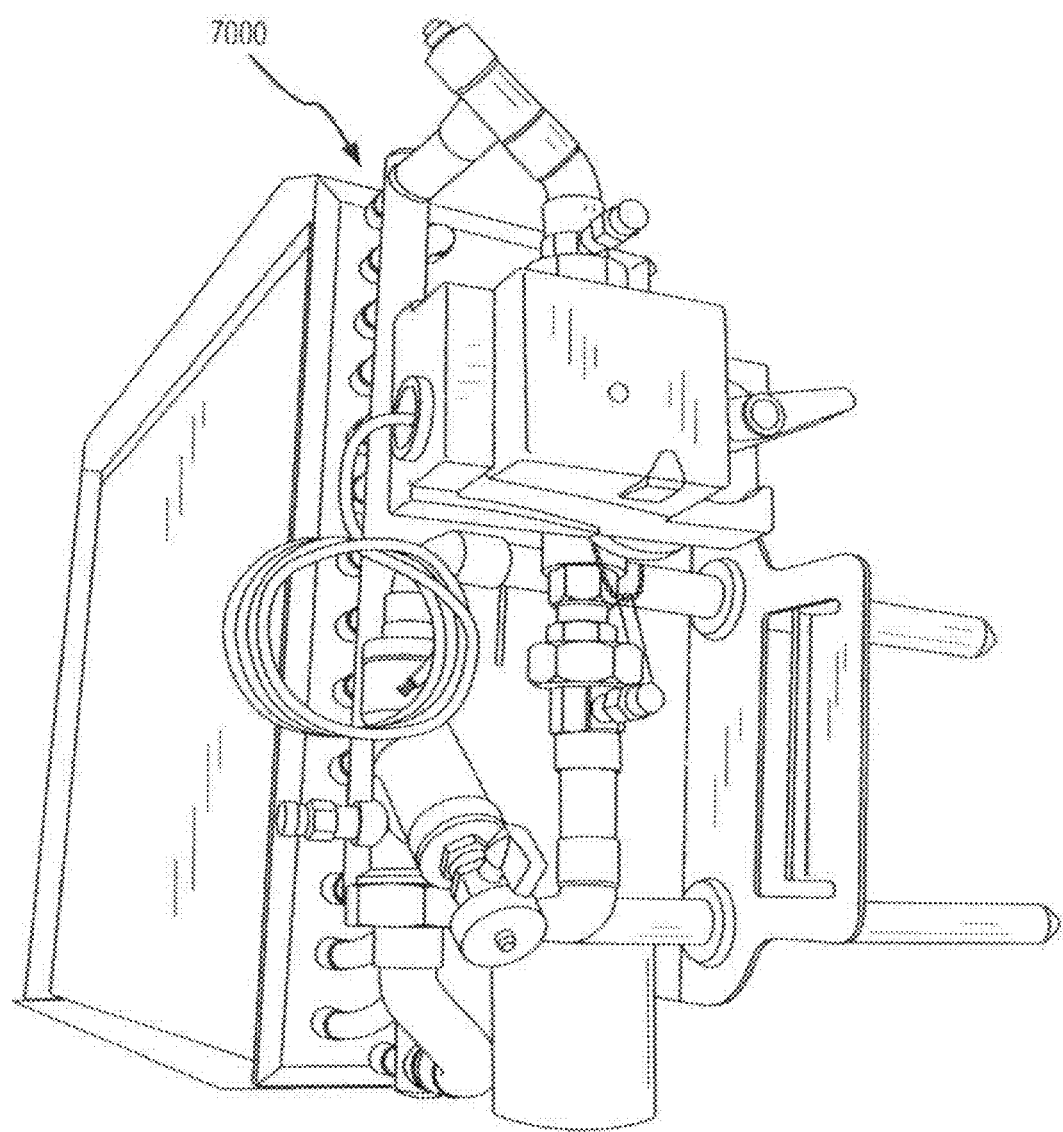
Figure 18E:
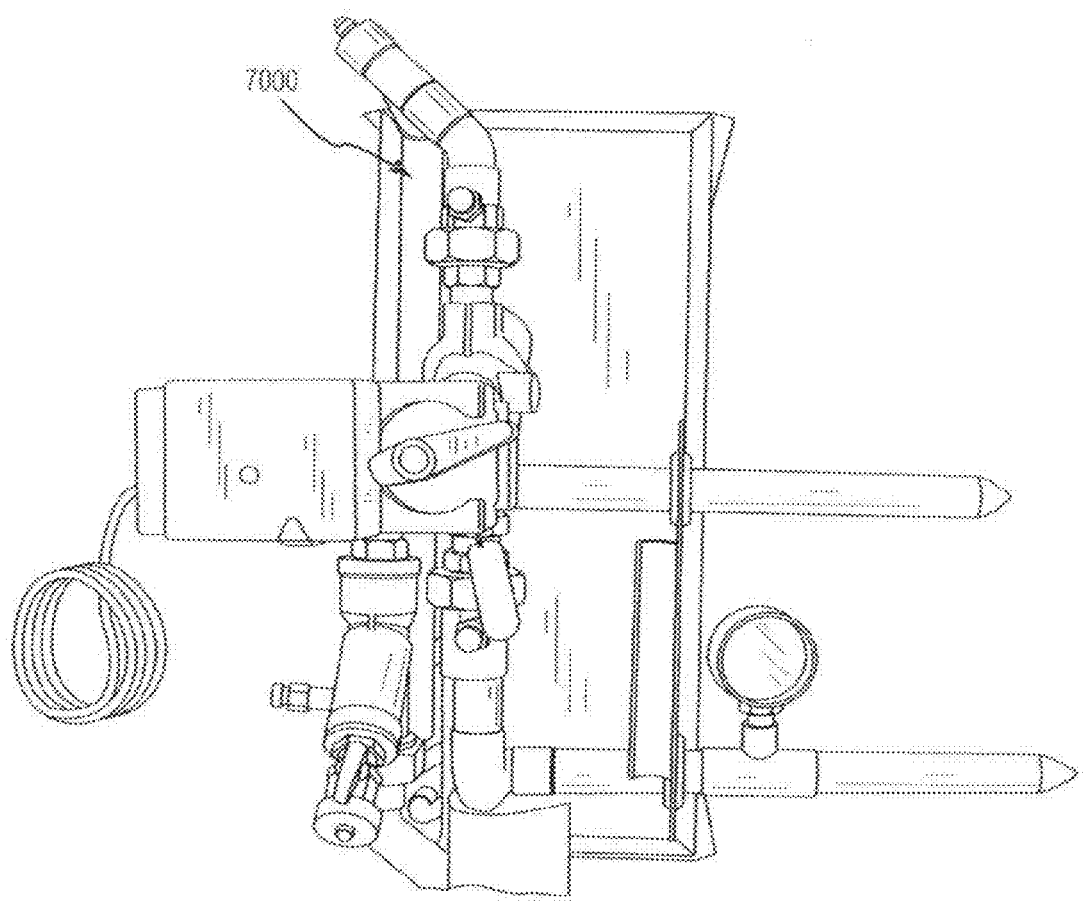

FIG. 17 illustrates a side view of a zone-control unit 6000 for use in an HVAC system, according to one embodiment of the present invention. In many ways, the embodiment shown in FIG. 17 is similar to that shown in FIG. 16. Zone-control unit 6000 includes a duct or casing 6100, an inlet piping assembly 6300, an outlet piping assembly 6400, and at least one bracket 6500. Zone-control unit 6000 also includes a housing 6900 coupled with casing 6100, such that housing 6900 encompasses various components of zone-control unit 6000 as described elsewhere herein, and to avoid prolixity are not described in detail here. The zone-control unit 6000 embodiment shown in FIG. 17 differs from the zone-control unit 5000 shown in FIG. 16, however, in a housing cover (not shown) of zone-control unit 6000 is removed, thereby exposing various elements contained in housing 6900. In some embodiments, the zone-control unit complies with a standard such as a Leadership in Energy and Environmental Design (LEED) standard, an American Society of Heating, Refrigerating, and Air Conditioning Engineers (ASHRAE) standard, an Air-Conditioning and Refrigeration Institute (ARI) standard, or a building code standard, or any combination thereof. Zone-control unit 6000 may be a capital piece of equipment, depreciable, and can be stocked by local distributors anywhere in the world as an "off the shelf" product. Zone-control unit 6000 is well suited for installation in a new HVAC system, or for retrofit in an existing HVAC system. It is also appreciated that the present invention also provides for the manufacture and installation of the zone-control units discussed herein. Such manufacture will often occur remotely from a job installation site, and may be performed by a union member selected from the group consisting of the United Association of Journeymen and Apprentices of the Plumbing and Pipefitting Industry of the United States and Canada, the construction sheet metal union, and the electrical union. In other embodiments, such union(s) may certify the fabrication site and/or supplier as being in compliance with the applicable union rules, that use of certain catalogued HVAC units complies with applicable union requirements and/or does not constitute a customized product so as violate work preservation rules. Relatedly, zone-control units or components thereof may be constructed by a manufacturing facility that is a signatory to any of these unions. Such manufacturing facilities may also have an Underwriter's Laboratory certification. Accordingly, zone-control units may include or be affixed with certain union, standards, or certification compliance labels.

FIGS. 18A-18E illustrate a heat exchanger coil 7000 packaged with components similar to those described above, with some or all of the components supported by support structures or handles. The heat exchanger coil, piping, valves, and/or valve controllers may be pre-assembled prior to shipping to a construction job site, with some or all of the assembly optionally being performed using robotic fabrication techniques and systems. The support structures or handles can facilitate handling and installation of the assembled unit, protect the unit and components thereof during shipping, and may also be used to support the unit after installation. The piping may terminate with sealed piping stubs during shipping and installation, with a pressure sensor and gauge allowing quick verification of the piping assembly integrity. Along with heat exchanger/coil units, other HVAC units such as fan coil units and the like may benefit from the systems and methods described herein. Standardization, quality control and tracking, and other improved structures and method described herein may also be implemented with such units.

Figure 19A:
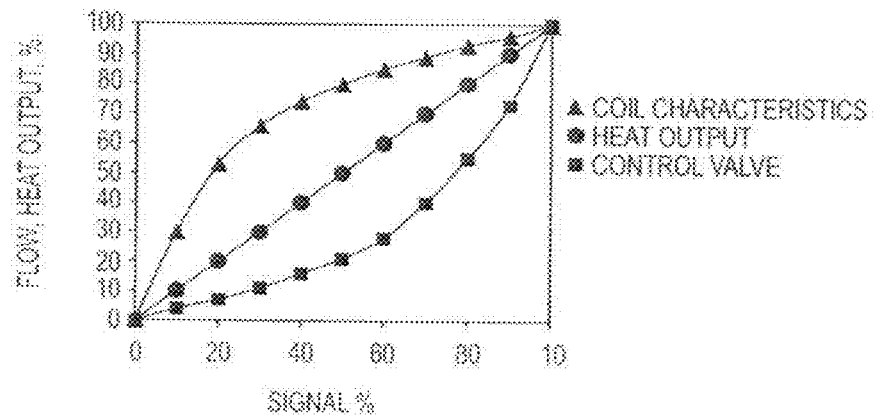
FIGS. 19A-19B illustrate differing HVAC units having standardized components, along with aspects of those components.
Figure 19B:
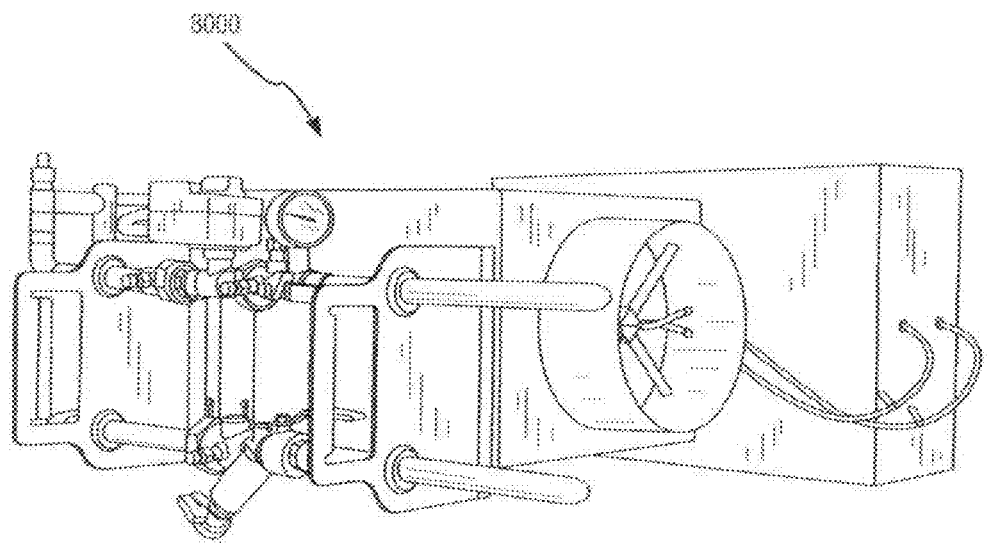

FIGS. 19A-19B generally illustrate standardization of components in differing HVAC units. Rather than attempting to minimize the costs of individual components of the many HVAC units in an HVAC system (which can lead to extensive on-site work, delays, and large installation labor costs), overall system installation efficiencies can be enhanced through the use of more standardized components, even if those components have capacities that exceed the requirements of some units.

Proportional valves (including those having characteristics similar to those graphically illustrated in FIG. 19A, such as the Belimo™ PICCV pressure independent proportional ball valve) and the like can facilitate integration of a single type of HVAC unit in multiple locations having differing specifications, tailoring the functioning of the unit by though appropriate use of the electronic controller software. FIG. 19B illustrates an HVAC hot water coil piping package unit 8000, while FIGS. 12A and 13A illustrate an HVAC proportional hot water valve package unit and a 2 way water valve package unit, respectively. FIG. 12B illustrates a support structure or handle which may be used in both, and FIG. 14A illustrates a 3 way water valve package unit. Despite the significant differences between these units, many, most, or all of the components (including piping components) may be common, with the aspect ratio of the piping optionally being identical. In some embodiments, zone-control units or heat exchanges can have pipe components with dimensions or configurations that are standardized or customized. For example, zone-control units can be manufactured to provide spun copper caps that are of a standard length or dimension, and that are oriented in a standard direction. Relatedly, zone-control units can be manufactured to provide piping assemblies, pipes, and other piping aspects that conform with a prescribed specification. In some cases, pipe components such as piping assemblies or end caps can have equal or otherwise prescribed lengths. Similarly, zone-control units can be configured so as to provide a standardized or customized distance between the piping assemblies of a single unit. Accordingly, sets of two or more zone-control units can be manufactured according to certain piping component specifications (e.g. length, dimension, orientation, and the like). Such standardization or customization can be applied to any of a variety of sizes and configurations of zone-control units or heat exchangers, and can provide heretofore unrecognized advantages and efficiencies in building construction and repair. For example, multiple zone-control units, each having a different size and configuration, can be manufactured having a standardized distance between piping assemblies or end caps.

Figure 20:
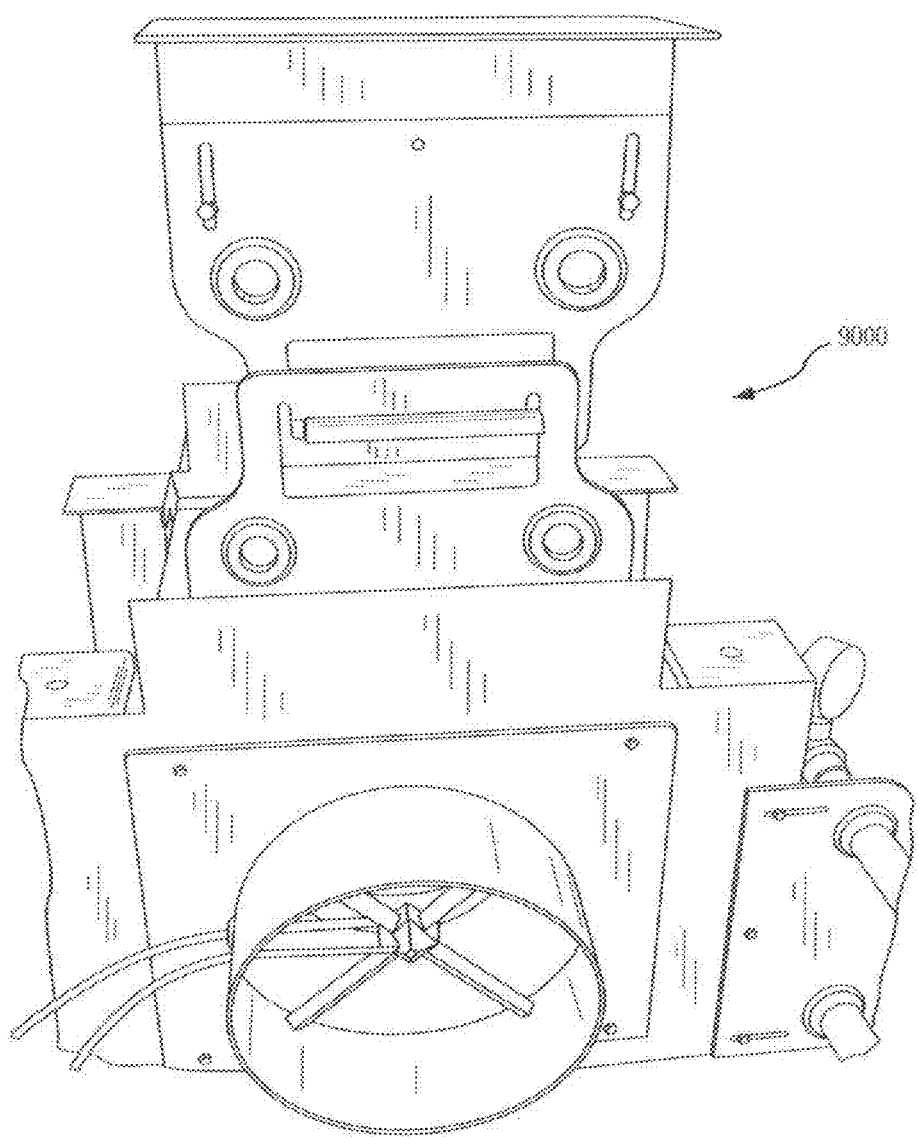
FIG. 20 illustrates interfacing of HVAC unit support structures, showing that the support structures can be used to suspend and support the HVAC unit for use in an HVAC system.

FIG. 20 illustrates engagement between the support structure or handle 9000 mounted to an HVAC unit and another similar corresponding support structure, allowing the support structures to be used as mounting fasteners. A plurality of different configurations of support structures can be provided with different sizes, different numbers, sizes, and configurations of holes and grommets for receiving piping, and the like. One or more supports may be secured to a joist, beam, or other building structure where the HVAC unit is to be installed. The unit support structure or handle is then lifted into engagement with the secured support(s), and the engaging surface at least temporarily "hanging" or maintaining the position of the HVAC unit. Fasteners may then affix the corresponding engaged support structures together to provide a secure and/or permanent installation. Deformable damping materials such as rubber, neoprene, resilient polymers, or the like along one or both of the engaging support surfaces can provide vibration and/or sound isolation. The support structures or handles may comprise carbon fiber, stainless steel, aluminum, plastic, or the like, and the engaging support structures may have similar shapes (as shown) or different shapes.

Figure 21A:
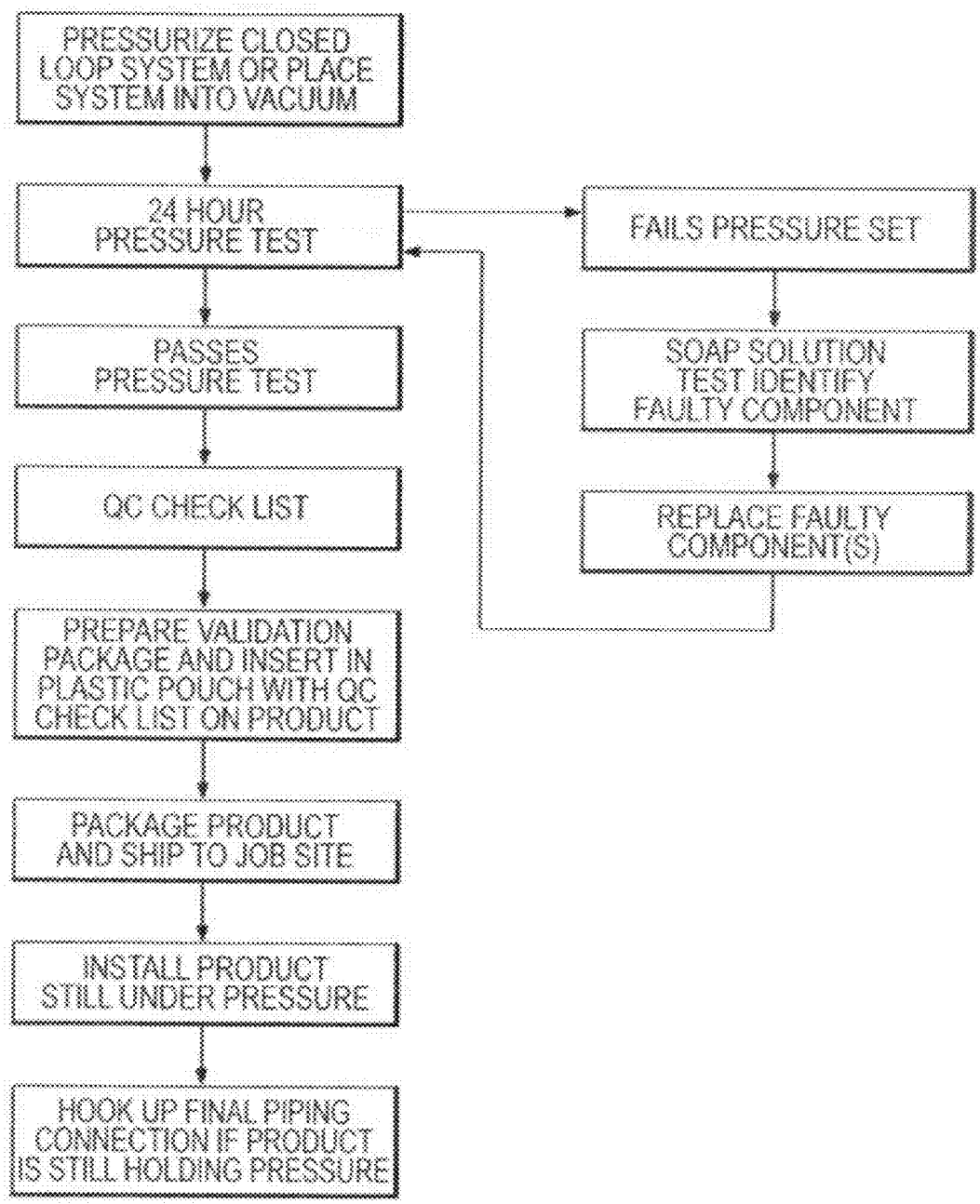
FIGS. 21A and 21B illustrate a quality control process and method for providing HVAC units and assembling and HVAC system.
Figure 21B:
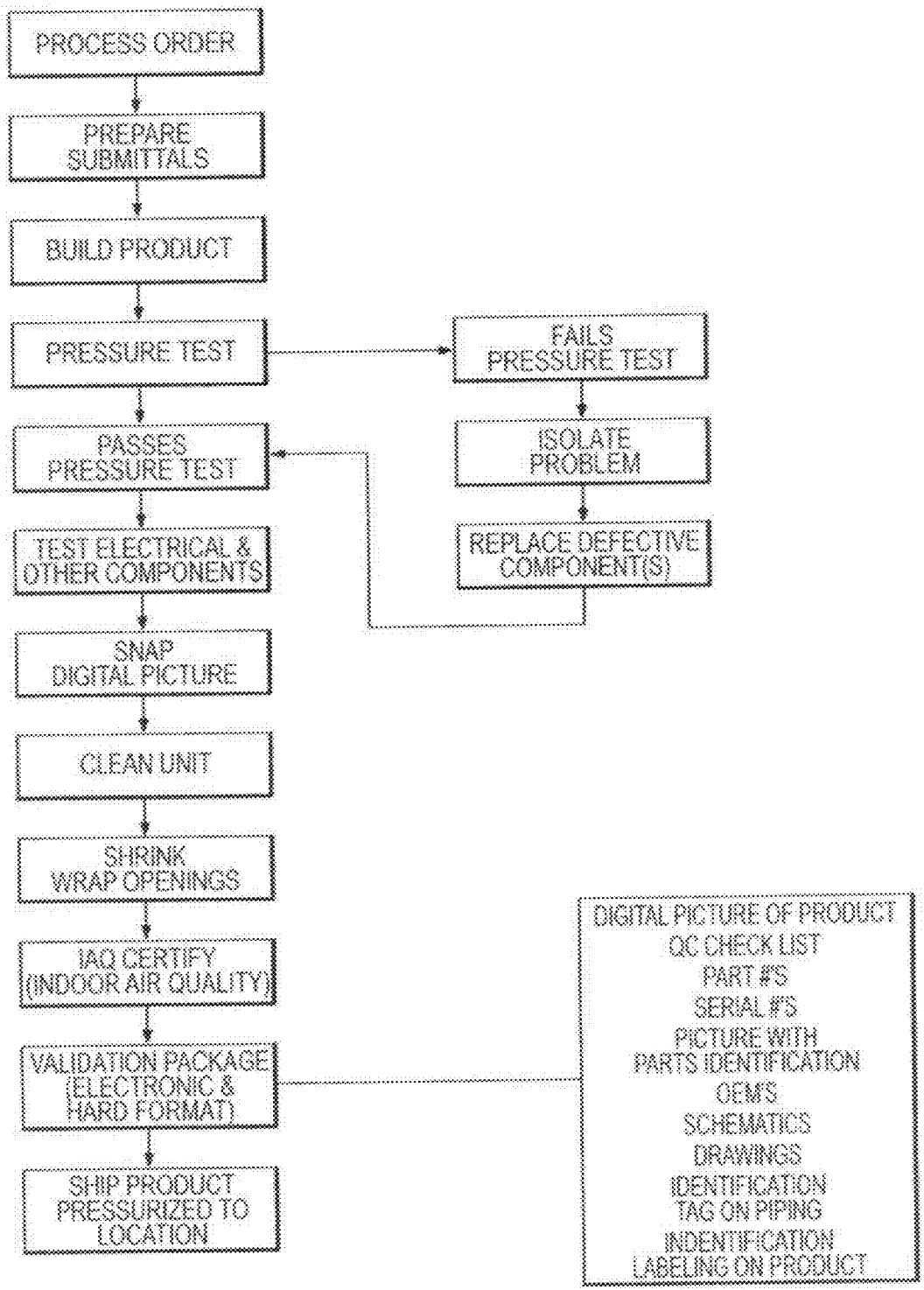

FIGS. 21A and 21B illustrate methods for testing and validation of HVAC units. HVAC units. Unit ordering and fabrication can be automated, and testing of piping by pressurizing piping assemblies, sealing, and verifying an acceptable pressure is maintained after a test period (for example, 24 hours) ensures leak-free fabrication. Any re-work can be identified and completed prior to shipping to a constructions site, and quality control documentation (optionally comprising a magnetic media such as a floppy disk, an optical media such as a mini CD, a memory such as a flash memory stick, or some other tangible media embodying machine readable computer data, a print-out, a digital photograph, and/or the like) can be associated with each unit to validate the components and testing. In some embodiments, such quality control may be integrated into the HVAC signal transmission system so as to facilitate remote validation via LAN conductors or a wireless network system, and/or radiofrequency identification or RFID techniques and structures may be employed.

Figure 22:
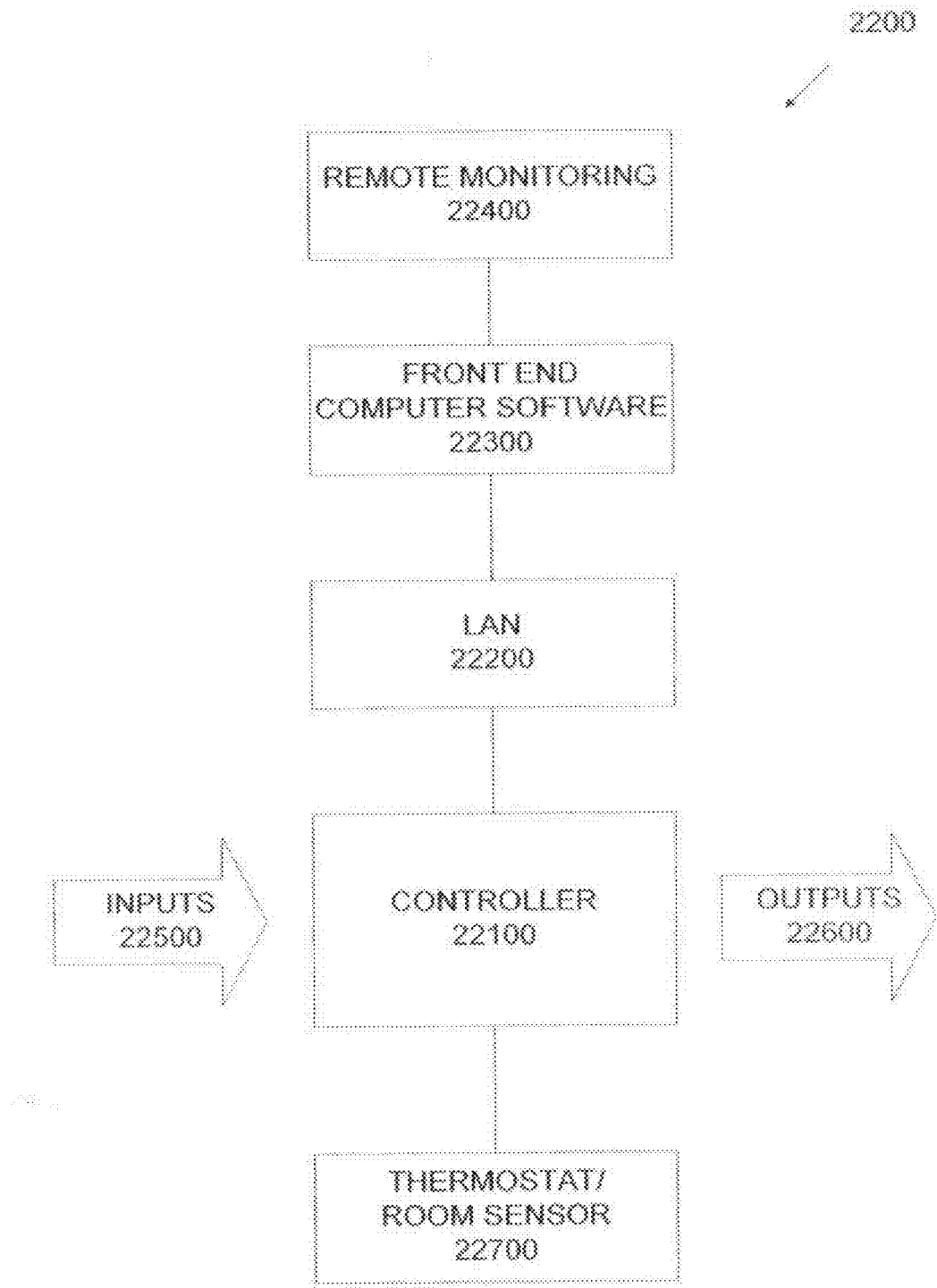
FIG. 22 shows a control assembly for an HVAC system.

FIG. 22 shows a control assembly 22000 for an HVAC system according to one embodiment of the present invention. Control assembly 22000 includes a controller 22100, a LAN 22200, a front end computer software 22300, a remote monitoring component 2240, and a thermostat or room sensor 22700. Control assembly 22000 may also receive a variety of inputs 22500 from, and transmit a variety of outputs 22600 to, a zone control unit or other HVAC component such as a proportional hot water valve package (PICCV), a two way water valve package (CCV), and the like. In some cases, control assembly 22000 can be in operative association with, for example, a factory precalibrated self balancing zone control unit or heat exchanger. Zone control units can include pressure/temperature ports, discharge air sensors, analog or digital pressure gauges, temperature resistors, and the like which can provide input to controller 22100. Similarly, controller 22100 can provide output to various components of a zone control unit, such as proportional actuators. These interconnectivities can allow a zone control unit to regulate pressure automatically. In some cases, a thermostat or room sensor 22700 may have a setpoint, and contain a digital display for showing pressure, gpm, space temperature, leaving air temperature, setpoint, and the like. Often these attributes or aspects thereof are transmitted from controller 22100 to thermostat 22700. Relatedly, room temperature, setpoints, and other variables can be transmitted from thermostat 22700 to controller 22100. Connectivity between various components of control assembly 22000, and between components of control assembly 22000 and other HVAC components, can be hardwired, wireless, or a combination thereof.

In one embodiment, a zone control unit includes a Belimo PICCV pressure independent automatic control valve or other pressure independent balancing valve on a heat exchanger such that water field balancing is eliminated or reduced. Components and sensors can be pre-calibrated at the factory. A sensor can be mounted in a plenum near the heat exchanger that senses leaving air temperature, pressure, and other variables. The plenum can be added at the factory. A room sensor or thermostat can be mounted in a desired room or zone. Controllers such as a DDC controller can be used with this system, and can be mounted, wired and pre-programmed at the factory. The controller can take inputs from the various sensors that are pre-wired to the controller at the factory. An exemplary sequence of operation can be described as follows. The temperature in the room is 70° F. and the occupant wishes to raise the temperature to 72° F. by adjusting the room sensor or thermostat to the desired set point. That signal is sent to the DDC controller. The leaving air temperature sensor senses or reads 70° F. at a heat exchanger discharge, and provides an input signal to the DDC controller. The DDC controller processes the two inputs: the room sensor and the leaving air sensor. The controller then sends a signal to the actuator on the automatic temperature control (ATC) valve actuator to open the valve and increase the gpm flow to heat exchanger coil thus raising the leaving air temperature (LAT) to an effective set point (e.g. 74° F.) until the room sensor measures the room air at 72° F. A balancing valve can be pressure independent and set at the factory so as to maintain a gpm regardless of pressure. In some cases, if more flow or hotter water is needed, a controller can send signals to a computer with front end software, and the computer can send signals to pumps or a boiler to adjust the temperature or gpm. Once the room sensor measures the desired set point, the controller closes the ATC valve thus limiting the gpm/flow through the heat exchanger device and maintaining the desired set point to extreme or programmed tolerances. This sequence of operation can occur every second. If the room temperature sways in any direction by even 0.01° F. or less, the LAT temperature can be adjusted immediately at the heat exchanger to maintain the desired heat exchanger. This process can save significant amounts of energy, can control the space temperature precisely, can provide for better indoor air quality, and can qualify the system for LEED building points/Green building initiative. Furthermore, the entire water side of the system can be completely self balancing. The need for technicians to go to the job site and balance, calibrate, take readings, and the like can be eliminated or reduced. Regulation can be accomplished through the building automation control system and can be self correcting automatically. This can be accomplished by providing a portable piping structure on the heat exchanger, which confers the ability to ship the heat exchanger with the portable piping structure attached, without incurring damage. By doing this, it is possible to add these features and benefits, including pre-calibration and pre-programming, to the portable piping structure of the heat exchanger on a cost effective basis, and also to associated products into which heat exchangers are installed. Similarly, it is possible to add these features and benefits to stand alone heat exchangers.

These approaches are well suited for a variety of environments, including biotech laboratories, clean rooms, offices, and the like. These techniques can provide for constant, real-time adjustments to maintain desired setpoints. Embodiments disclosed herein can be used to replace or reduce the need for manual balancing, and can modulate ATC valves to keep gpm appropriately adjusted.

Figure 23:
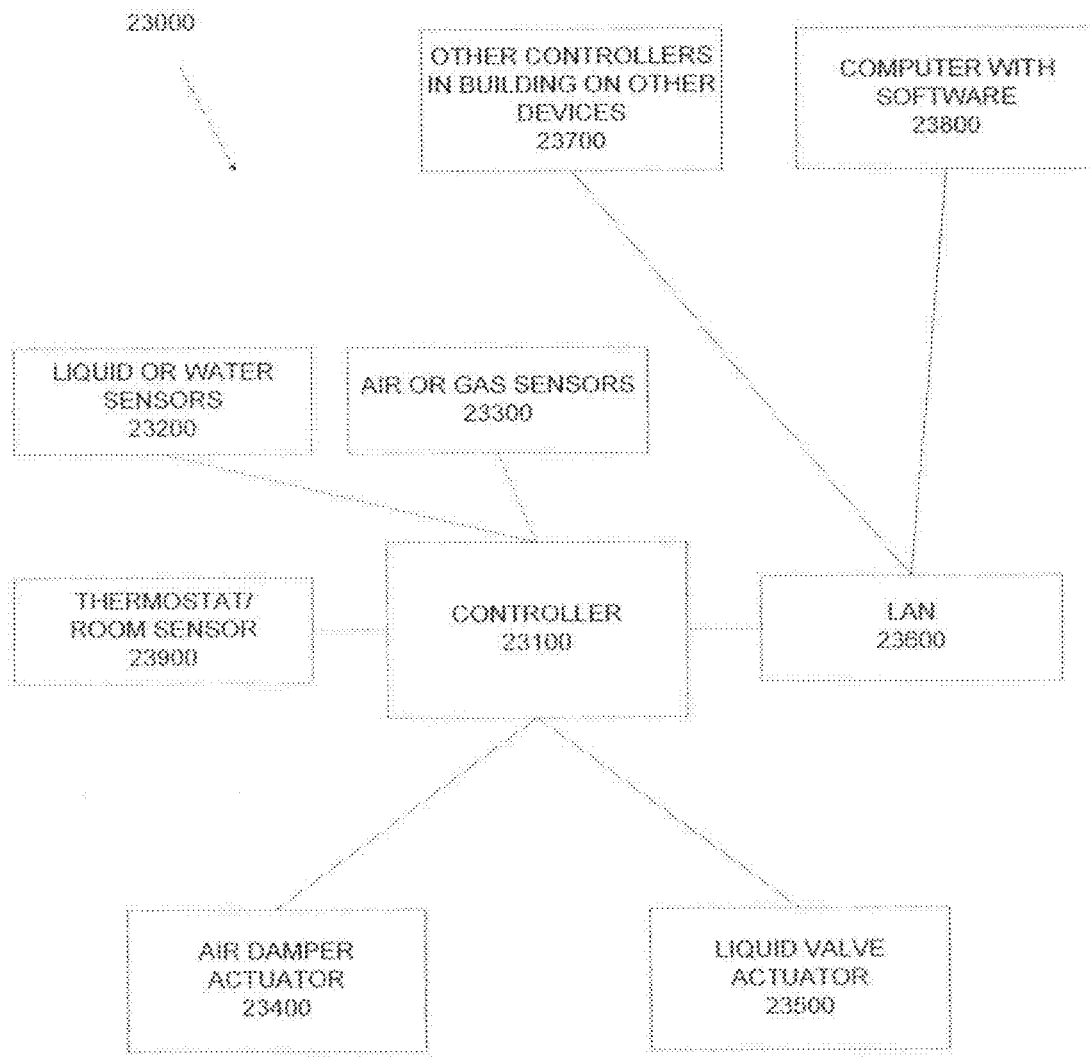
FIG. 23 shows an embodiment of a zone control unit or heat exchanger smart control configuration.

FIG. 23 shows an embodiment of a zone control unit or heat exchanger smart control configuration 23000. Configurations such as these can be used for one or more zones or products. A controller 23100, which optionally includes a read out or display, receives input from liquid sensors 23200 such as flow sensors, pressure sensors, and the like. Controller 23100 also receives input from air sensors 23300 such as leaving air temperature sensors, pressure sensors, and the like. Controller 23100 can provide output to an air damper actuator 23400, a liquid valve actuator 23500, or other zone control unit or heat exchanger component. Controller 23100 may also receive data from, and transmit data to, a LAN, which may be in operative association with one or more controllers 23700 of other devices in the building, and with a computer 23800 containing operational software. Controller 23100 may also receive data from, and transmit data to, a thermostat 23900 with a room sensor and a setpoint adjustment with read out. Thermostat 23900 can display any parameter of a zone control unit or heat exchanger including flows, temperatures, pressures, and the like. Similarly, thermostat 23900 can display all data transmitted between controller 23100 and thermostat 23900. A technician can trouble shoot this configuration via readouts from thermostat 23900, controller 23100, or other components. In some embodiments, a technician can trouble shoot from a wireless PDA which is in operative association with one or more components of configuration 23000. Any parameter of configuration 23000 can be set at a manufacturer's factory and can be pre-calibrated. For example, air and water balancing and calibration can be done at the factory. Thereafter, any air and water balancing changes in the field can be accomplished via a computer which may be remotely linked with the configuration. In this way, a system can be self-balancing and energy efficient. Moreover, the system exhibits improved indoor air quality (IAQ) control, comfort, and response time.

Table 1 shows an example of a PICCV pressure independent ATC valve three point floating with ninety second stroke time values.

TABLE 1

| Range | Setpoint | Actual | Value | Open | ° F. | Stroke Time |
|---|---|---|---|---|---|---|
| .1-2 | 72 | 71 | 1 | 10% | 75 | 9 |
|  |  | 70 | 2 | 20% | 80 | 9 |
|  |  | 69 | 3 | 30% | 85 | 9 |
|  |  | 68 | 4 | 40% | 90 | 9 |
|  |  | 67 | 5 | 50% | 95 | 45 second stroke time |
|  |  | 66 | 6 | 60% | 100 | 9 |
|  |  | 65 | 7 | 70% | 105 | 9 |
|  |  | 64 | 8 | 80% | 110 | 9 |
|  |  | 63 | 9 | 90% | 115 | 9 |
|  |  | 62 | 10 | 100% | 120 | 90 seconds full open |

Figure 24:
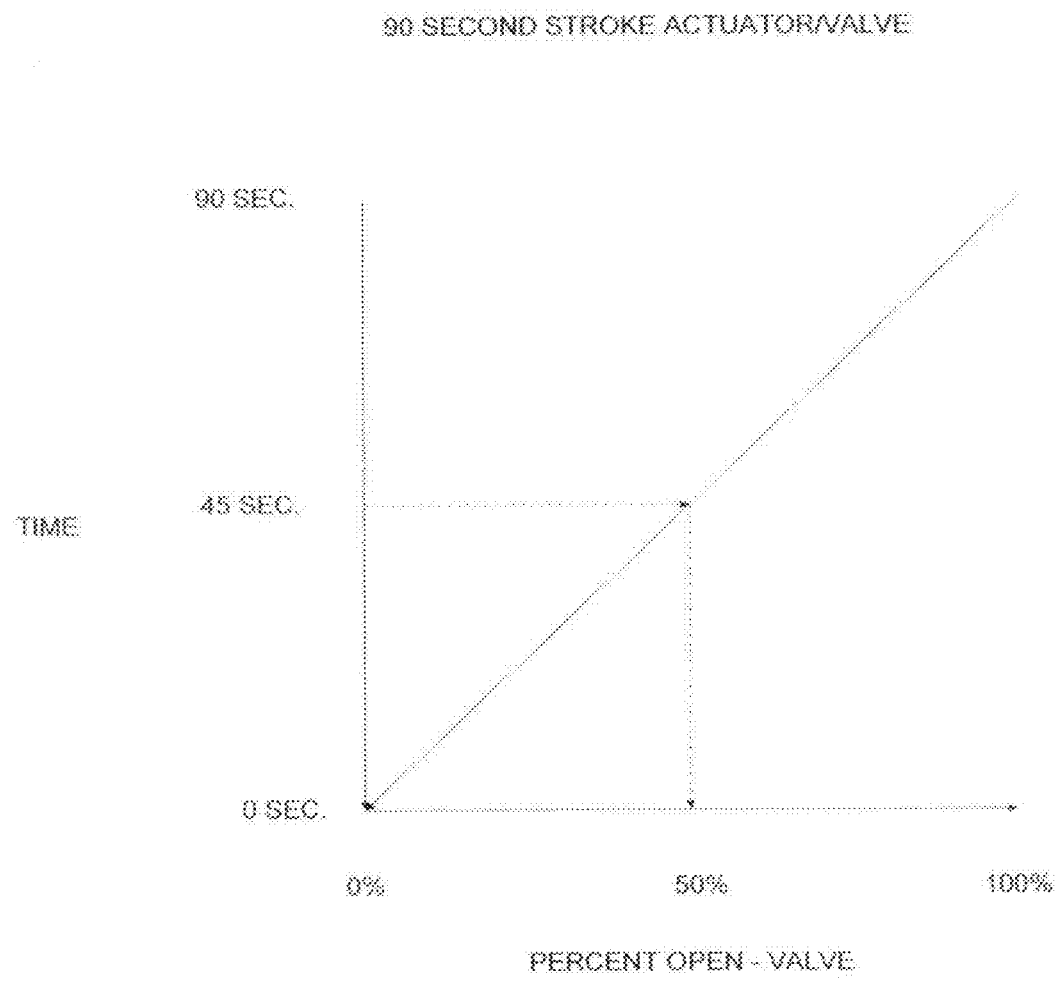
FIG. 24 shows graph of a front and mathematical calculation or algorithm based on desired performance and time values.

FIG. 24 shows graph of a front end mathematical calculation or algorithm based on desired performance and time values. Units can be accordingly bench tested and pre-calibrated and balanced at the factory.

Although zone control units, thermal transfer units, and other elements of environmental control systems discussed herein are often referred to in terms of HVAC units, it is appreciated that such zone control units, thermal transfer units, and the like may find use in any of a variety of control systems. Moreover, although transfer units are often described as, for example, coil structures, embodiments encompassed herein include any of a variety of transfer unit or control unit configurations. Piping structures and configurations disclosed herein can be used in any of a variety of heat exchanger devices, systems, or methods.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A zone-control unit for use in a climate control system, the zone-control unit comprising:
   a casing;
   a thermal transfer assembly at least partially disposed within the casing, the thermal transfer assembly having a supply port and a return port;
   an inlet piping assembly for supplying fluid to the thermal transfer assembly, the inlet piping assembly having a first passage coupled with the thermal transfer assembly supply port and a second passage coupleable with an upstream fluid source, wherein at least a portion of the inlet piping assembly is disposed exterior to the casing;
   an outlet piping assembly for receiving fluid from the thermal transfer assembly, the outlet piping assembly having a first passage coupled with the thermal transfer assembly return port and a second passage coupleable with a downstream fluid destination, wherein at least a portion of the outlet piping assembly is disposed exterior to the casing;
   a duct interface coupled with the casing;
   a bracket supporting the duct interface, the inlet piping assembly, and the outlet piping assembly with relative positions appropriate for use in the climate control system, wherein at least a portion of the bracket is disposed exterior to the casing; and
   a damper assembly controller coupled with the casing, the damper assembly controller configured to receive a signal from a thermostat or a room sensor.

2. The zone-control unit according to claim 1, wherein the inlet piping assembly second passage and the outlet piping assembly second passage are each sealed, the inlet piping assembly first passage is in sealed communication with the thermal transfer assembly supply port, and the outlet piping assembly first passage is in sealed communication with the thermal transfer assembly return port.

3. The zone-control unit according to claim 1, wherein the thermal transfer unit contains a vacuum, a non-pressurized fluid, or a pressurized fluid.

4. The zone-control unit according to claim 1, further comprising a pressure gauge coupled with a member selected from the group consisting of the thermal transfer assembly, the inlet piping assembly, and the outlet piping assembly.

5. A zone-control unit for use in a climate control system, the zone-control unit comprising:

a thermal transfer assembly having a supply port and a return port;

an inlet piping assembly having a first passage coupled with the thermal transfer assembly supply port and a second passage coupleable with an upstream fluid source;

an outlet piping assembly having a first passage coupled with the thermal transfer assembly return port and a second passage coupleable with a downstream fluid destination;

a duct interface; and a bracket supporting the duct interface, the inlet piping assembly, and the outlet piping assembly with relative positions appropriate for use in the climate control system.

6. The zone-control unit according to claim 5, wherein the inlet piping assembly second passage and the outlet piping assembly second passage are each sealed, the inlet piping assembly first passage is in sealed communication with the thermal transfer assembly supply port, and the outlet piping assembly first passage is in sealed communication with the thermal transfer assembly return port.

7. The zone-control unit according to claim 6, wherein the thermal transfer unit contains a vacuum, a non-pressurized fluid, or a pressurized fluid.

8. The zone-control unit according to claim 5, further comprising a pressure gauge coupled with a member selected from the group consisting of the thermal transfer assembly, the inlet piping assembly, and the outlet piping assembly.

9. The zone-control unit according to claim 5, wherein the inlet piping assembly is coupled with a member selected from the group consisting of a drain, a strainer, a pressure gauge, a pressure/temperature port, and a supply shutoff valve.

10. The zone-control unit according to claim 5, wherein the outlet piping assembly is coupled with a member selected from the group consisting of a control valve, a balancing valve, a vent, a pressure gauge, a pressure/temperature port, and a return shutoff valve.

11. The zone-control unit according to claim 5, wherein the duct interface is coupleable with a duct of the climate control system, such that the duct houses at least a portion of the thermal transfer unit.

12. The zone-control unit according to claim 5, further comprising a bypass piping assembly coupling the inlet piping assembly with the outlet piping assembly.

13. The zone-control unit according to claim 5, wherein the zone-control unit complies with a standard selected from the group consisting of a Leadership in Energy and Environmental Design (LEED) standard, an American Society of Heating, Refrigerating, and Air Conditioning Engineers (ASHRAE) standard, an Air-Conditioning and Refrigeration Institute (ARI) standard, and a building code standard.

14. The zone-control unit according to claim 5, wherein at least one of the inlet piping second passage or the outlet piping second passage is coupled with a hose via a press-fitting joint.

15. The zone-control unit according to claim 14, wherein the press-fitting joint complies with an applicable standard.

16. The zone-control unit according to claim 15, further comprising a validation package comprising a member selected from the group consisting of a digital picture of the zone-control unit, a completed quality control sheet, an operations and maintenance document, a parts list with model number, an Indoor Air Quality (IAQ) certification, and a piping, electrical, and controls schematic.

* * * * *